US012377653B2

(12) United States Patent
Schneider et al.

(10) Patent No.: US 12,377,653 B2
(45) Date of Patent: Aug. 5, 2025

(54) INKJET PRINTING SYSTEM WITH NOZZLE EVAPORATOR

(71) Applicant: Scrona AG, Zürich (CH)

(72) Inventors: Julian Schneider, Muttenz (CH); Martin Schmid, Zürich (CH); Patrick Galliker, Richterswil (CH)

(73) Assignee: Scrona AG, Zürich (CH)

( * ) Notice: Subject to any disclaimer, the term of this patent is extended or adjusted under 35 U.S.C. 154(b) by 223 days.

(21) Appl. No.: 18/277,687

(22) PCT Filed: Feb. 4, 2022

(86) PCT No.: PCT/EP2022/052748
§ 371 (c)(1),
(2) Date: Aug. 17, 2023

(87) PCT Pub. No.: WO2022/175119
PCT Pub. Date: Aug. 25, 2022

(65) Prior Publication Data

US 2024/0123729 A1 Apr. 18, 2024

(30) Foreign Application Priority Data

Feb. 18, 2021 (WO) ................. PCT/EP2021/054065

(51) Int. Cl.
*B41J 2/14* (2006.01)
*B41J 2/06* (2006.01)
(Continued)

(52) U.S. Cl.
CPC . *B41J 2/14* (2013.01); *B41J 2/06* (2013.01); *B41J 2/18* (2013.01); *B41J 11/0022* (2021.01);
(Continued)

(58) Field of Classification Search
CPC ......... B41J 2/14; B41J 2/06; B41J 2/18; B41J 11/0022; B41J 2202/02; B41J 2202/12; B41J 2202/18
See application file for complete search history.

(56) References Cited

U.S. PATENT DOCUMENTS 4,403,234 A 9/1983 Miura et al.
4,829,325 A 5/1989 Iwasawa et al.
(Continued)

FOREIGN PATENT DOCUMENTS

EP 3 157 071 4/2017
JP 1-165452 6/1989
(Continued)

OTHER PUBLICATIONS

Int'l Search Report (Form PCT/ISA/210) conducted in Int'l Appln. No. PCT/EP2021/052748 (Apr. 5, 2022).
(Continued)

*Primary Examiner* — Bradley W Thies
(74) *Attorney, Agent, or Firm* — GREENBLUM & BERNSTEIN, P.L.C.

(57) ABSTRACT

An electrohydrodynamic inkjet printing system includes a print head with a plurality of ink nozzles arranged in recesses on the print head. A plurality of ejection electrodes located at the ink nozzles. A support structure is arranged in front of the ink nozzles and forming a front surface, wherein the ejection electrodes are arranged on the support structure. Gas from a first gas source and/or from a second gas source is conveyed through gas ducts and or gas is fed through the gas ducts to a gas sink. The gas ducts extend, over at least part of their length, along the support structure.

39 Claims, 14 Drawing Sheets

(51) Int. Cl.
*B41J 2/18* (2006.01)
*B41J 11/00* (2006.01)

(52) U.S. Cl.
CPC ........ *B41J 2202/02* (2013.01); *B41J 2202/12* (2013.01); *B41J 2202/18* (2013.01)

(56) References Cited

U.S. PATENT DOCUMENTS

| | | | |
|---|---|---|---|
| 6,631,983 | B2 | 10/2003 | Romano, Jr. et al. |
| 2014/0313259 | A1 | 10/2014 | Arimizu et al. |
| 2017/0101711 | A1 | 4/2017 | McGraw et al. |
| 2020/0291521 | A1 | 9/2020 | McGraw et al. |
| 2021/0070043 | A1 | 3/2021 | Tse et al. |
| 2022/0242118 | A1 * | 8/2022 | Galliker ................. B41J 2/1433 |

FOREIGN PATENT DOCUMENTS

| | | |
|---|---|---|
| WO | 2013/000558 | 1/2013 |
| WO | 2016/120381 | 8/2016 |
| WO | 2016/169956 | 10/2016 |
| WO | 2021/008698 | 1/2021 |
| WO | 2021/008699 | 1/2021 |
| WO | 2021/008817 | 1/2021 |
| WO | 2021/093929 | 5/2021 |
| WO | 2021/257998 | 12/2021 |

OTHER PUBLICATIONS

Int'l Written Opinion (Form PCT/ISA/237) conducted in Int'l Appln. No. PCT/EP2021/052748 (Apr. 5, 2022).

* cited by examiner

INKJET PRINTING SYSTEM WITH NOZZLE EVAPORATOR

RELATED APPLICATIONS

This patent application claims priority of international patent application PCT/EP2021/054065 filed 18 Feb. 2021.

TECHNICAL FIELD

The invention relates to an electrohydrodynamic inkjet printing system with a print head and with a plurality of ink nozzles on a print head and with gas ducts arranged at least partially in the print head.

Background Art

WO2021008817 describes an electrohydrodynamic inkjet printing system with a print head having a plurality of ventilation ducts located at the ink nozzles. The ventilation ducts are used to feed dry gas to the space between the print head and the target, thereby expediting a uniform drying of the ink on the target.

U.S. Pat. No. 4,829,325 describes an electrohydrodynamic inkjet printing system with a print head having a single nozzle and a gas duct ending at the nozzle. The gas is used to convey the ink drops towards the target.

DISCLOSURE OF THE INVENTION

The problem to be solved by the present invention is to provide a compact print head for such printing systems.

This problem is solved by the printing system of claim 1.

Hence, the invention relates to an inkjet printing system comprising at least the following elements:

A print head.

A plurality of ink nozzles: These are the nozzles from where the ink droplets are ejected. They are arranged on the print head.

A plurality of ejection electrodes ejection electrodes located at the nozzles. They are positioned to eject ink drops from the nozzles by means of electrical fields acting on the ink.

A support structure arranged in front of the ink nozzles: This support structure forms the front surface of the print head. The ejection electrodes are arranged on the support structure.

A plurality of recesses arranged in the front surface with at least one of the ink nozzles arranged in each of the plurality of recesses. (Note that there may be further recesses in the front surface, in addition to said "plurality of recesses" that do not fulfill the conditions of claim 1.)

A plurality of gas ducts extending, over at least part of their length, along the support structure: These gas ducts are provided to feed gas to/from the nozzles. Hence, the support structure is used not only to support the electrodes, but it is also used to form several individual gas ducts, which allows for a more compact design of the print head.

In particular, the gas ducts may extend, over at least part of their length, parallel to the front surface of the print head.

Advantageously, at least some of the ends of the gas ducts are arranged in the recesses at the ink nozzles.

Advantageously, the ejection electrodes may be arranged around the recesses between the front surface and the ink nozzles.

In one embodiment, the printing system may comprise:

A first gas source: This is a source of a gas, and it is adapted and structured to feed gas into the first gas ducts of the next paragraph.

First gas ducts arranged at least partially in the print head: These first gas ducts form at least part of the gas ducts. They have at least a first end connected to the first gas source and a plurality of second ends arranged at the ink nozzles. In this context, "arranged at the ink nozzles" is advantageously to be understood such that thedistance between the second ends and the closest nozzle is less than 100 μm, in particular less than 50 μm, in particular less than 10 μm.

At least one evaporator arranged along first gas ducts before the nozzles: This evaporator is adapted to evaporate at least one fluid into the gas before it arrives at the nozzles. Thus, it is possible to increase the concentration of said fluid in the gas.

This embodiment is based on the understanding that one factor impacting the reliability of inkjet printing systems is thedeposition of dried ink residuals at the nozzles. Further, it is based on the idea that such drying can be reduced or even avoided by feeding a gas to the ink ducts and by using an evaporator to increase the concentration of at least one substance in the gas before it reaches the nozzles, thereby creating an atmosphere, at the nozzles, into which ink is less likely to evaporate.

The evaporator may in particular be used to evaporate a solvent used in the ink, or a substance similar to the solvent, thereby more efficiently reducing the amount of ink solvent that evaporates at the nozzles.

As mentioned, the first gas ducts are arranged at least partially in the print head. The first gas source is, however, advantageously a part separate from (i.e. not integrally connected to) the print head.

Advantageously, at a location below the ejection electrode, thediameter of the recess (in a direction perpendicular to the nozzle axis) may be larger than the inner diameter of the nozzle to form a widened pocket for receiving the nozzle. Such a design reduces the risk of ink reaching the walls of the recess.

In particular, the print head may further comprise a nozzle carrier forming the base (i.e. read end) of the recesses and extending parallel to the front surface. The nozzles are mounted to the nozzle carrier. The gas ducts have duct sections that extend parallel to the nozzle carrier in a region between the nozzle carrier and the front surface. Hence, the region between the nozzle carrier and the front surface is used to accommodate at least part of the gas ducts.

Advantageously, at least some said duct sections extend along several of the nozzles, in particular along a row of the nozzles in a two-dimensional array of nozzles.

The printing system may further comprise the following elements:

A second gas source. This is a source of a gas, and it is adapted and structured to feed gas into the second gas ducts mentioned in the next paragraph. The second gas source may be the same unit as, or share components with, the first gas source.

Second gas ducts, forming at least part of the gas ducts and being arranged at least partially in the print head: These second gas ducts have at least a first end connected to the second gas source and a plurality of second ends arranged at the ink nozzles, with the second ends of the first gas ducts being closer to the ink nozzles than the second ends of the second gas ducts.

The second gas ducts do not communicate with the evaporator(s), i.e. the gas passing from their first to their second ends does not pass along any evaporator. Hence, the gas emerging from the second ends of the second gas ducts is dryer than the gas emerging from the second ends of the first gas ducts.

This design allows feeding dry gas, by means of the second gas ducts, to the area between the nozzles and the target, expediting thedrying of the ink on the target while the first gas ducts reduce thedrying of ink at the nozzles.

The second ends of the second gas ducts are advantageously located at the front surface of the print head while the second ends of the first gas ducts are located in the recesses, thereby making it even less likely that dry gas from the second gas duct reaches the nozzles.

The printing system may further comprise the following elements:

A gas sink: This is a sink of a gas, and it is adapted and structured to suck gas from the third gas ducts mentioned in the next paragraph.

Third gas ducts forming at least part of the gas ducts and being arranged at least partially in the print head: These third gas ducts have first ends located at the nozzles and at least a second end connected to the gas sink.

These third gas ducts allow remove at least part of the gas that has been conveyed into the region between the print head and the target by the first and/or second gas ducts.

Without the third gas ducts, the excess gas from the first and/or second gas ducts to this region would have to escape in lateral direction (i.e. in a direction parallel to the front surface of the print head), thereby generating a lateral flow of gas that would be stronger at the periphery of the print head than at its center, which would tend to deflect the ink drops.

Advantageously, the second ends of the first gas ducts are closer to the ink nozzles than the first ends of the third gas ducts, which prevents the gas from the first gas ducts from being conveyed off before it can reach the nozzles.

The print head may comprise a plurality of parallel sections of the gas ducts that extend along (i.e. parallel to) the support structure, with the sections being separated by walls. This is advantageous over just providing a large shared space of gas passage in that it allows a better control of the flow of the gas to its destination.

The invention also relates to a method for operating a printing system as described herein. It comprises at least the following steps:

Feeding ink to the ink nozzles.

Feeding a gas from the gas source through the gas ducts and/or feeding gas through the gas ducts to a gas sink. This gas feeding defines at least part of the atmospheric conditions at the location of the ink nozzles.

Advantageously, the method comprises the step of evaporating, by means of an evaporator, at least one liquid into the gas fed through the gas ducts. This allows to increase the humidity at the nozzles, thereby reducing the evaporation rate at the location of the ink nozzles.

The temperature of the gas at the position of the evaporator may be at the same magnitude as it is at the print head, particularly at the nozzle, in order to prevent condensation or incomplete saturation, which again would promote evaporation from the nozzle. Advantageously, the temperature of the gas at the position of the evaporator is within 5°, in particular within 2°, of the temperature at the nozzle.

In particular, the ink may comprise a solvent, and the liquid comprises at least one component of the solvent. In this context, the term "solvent" designates a part of the ink that is able to evaporate. The solute of the ink, i.e. the solid portion remaining on the substrate once the solvent has dried, is/are typically dissolved, dispersed or otherwise suspended in the solvent.

If the printing system has second and third gas ducts as mentioned above, the total gas flow through the first and second gas ducts is advantageously equal to a total gas flow through the third gas ducts. In this context, two gas flows are advantageously considered to be equal if they differ by less than 20%, in particular by less than 10%.

BRIEF DESCRIPTION OF THE DRAWINGS

The invention will be better understood and objects other than those set forth above will become apparent when consideration is given to the following detailed description thereof. Such description makes reference to the annexed drawings, wherein:

Note that in FIGS. 3-10, 12, 13, 15, 16, 19, and 22 black parts denote hollow regions or (for vias) metal regions and white parts denote solid regions. In FIGS. 11, 14 and 17, black parts denote metallic or conductive parts and white parts denote dielectric, non-conductive parts.

FIG. 2 does not have the same scaling as FIGS. 3-18 in order to show several nozzles at the same time in FIGS. 3-18.

MODES FOR CARRYING OUT THE INVENTION

Definitions

"Forward" or "front" defines thedirection into which the print head is designed to eject ink. For example, the ejection electrodes are forward from and in front of the nozzles.

"Backward" or "behind" defines the opposite direction. For example, the nozzles are arranged backward from or behind the ejection electrodes.

"At the front" and "at the back" are understood to designate a location at levels forward from or backward from something else.

"Front" and "back" are the forward and backward sides.

Properties "at a given nozzle" are advantageously understood as properties that are true for a majority, in particular for least at 90%, of the nozzles. For example, if it is said that "at a given nozzle, the guard electrode is arranged between the ejection electrode and the ink retainer", this advantageously means that this is true for a majority of the nozzles, in particular for at least 90% of them. It may e.g. be that there are some nozzles that do not have ejection electrodes and/or guard electrodes, such as nozzles at the edges of the print head and/or unused nozzles.

The ejection direction X of the print head defines the "vertical" upwards direction, i.e. the print head is, by definition, designed to eject ink upwards. (In operation, it may, of course, be under any angle to thedirection of gravity.) Hence, definitions such as "above" and "below" are to be understood in reference to this definition of"vertical".

"Horizontal" is any direction perpendicular to the vertical direction.

"Lateral" designates something that is horizontal from something is else.

Printing System

Figure 1:
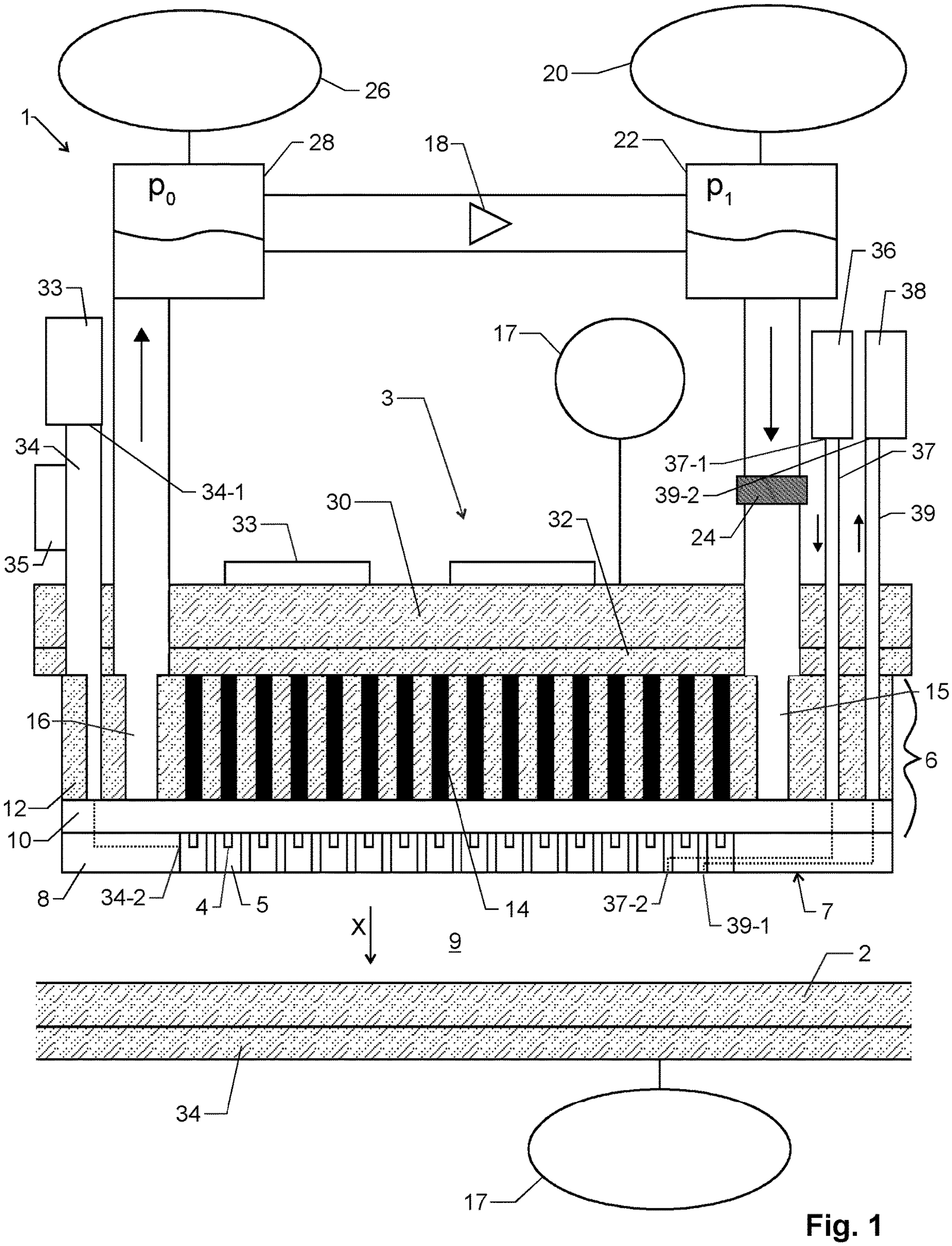
FIG. 1 shows a schematic view of a printing system with a partially sectional view of a print head and of the target.

FIG. 1 shows a schematic view of an embodiment of the printing system 1. It is depicted above a target 2, and it is structured to eject ink along an ejection direction X onto the target.

The print head comprises a plurality of nozzles 4 located at the front side of a nozzle carrier 6. The nozzles 4 are advantageously arranged in a one- or two-dimensional array in recesses 5 in a front surface 7 of print head 3, in particular with more than 10 nozzles per row and/or column.

The printing system has a print head 3 with a plurality of ejection electrodes (not shown in FIG. 1) for ejecting ink from the nozzles 4 and optional further electrodes arranged on a support structure 8, thedesign of which is described in more detail below. Further electrodes may be provided in electrical contact with the ink to set the ink to a defined electrical potential.

Nozzle carrier 6 comprises a front layer 10, with the nozzles 4 being mounted to the front side of front layer 10 and forming projections thereon. It also comprises a backing layer 12 located at the back side of front layer 10.

The internal structure of front layer 10 is not shown in FIG. 1 and will be described in more detail below. It may e.g. be of a dielectric, in particular comprising several sublayers of polymer and/or glass.

Backing layer 12 may e.g. be an insulated semiconductor material or it may be a dielectric. Advantageously, backing layer 12 is, at least partially, of glass.

Electrical vias 14 are connected to the ejection electrodes and extend through front layer 10 and the backing layer 12 for connecting the ejection electrodes to a voltage supply 17. Advantageously, there is at least one via 14 for each nozzle 4. Further vias may be provided to connect other electrodes to voltage supply 17.

Ink ducts 15, 16 supply ink to the nozzles 4 and (optionally) recycle ink back from the nozzles 4. They are located, in part, in front layer 10, and they e.g. extend through peripheral regions of backing layer 12. Their design is described in more detail below.

At least one pump 18 and/or another pressure source or vacuum source is provided to supply ink to the supply ducts 15 and, if there are suction ducts, to retrieve ink from the suction ducts 16.

Advantageously, the printing system comprises a first pressure control 20 for generating a first defined pressure p1 at the input of the supply ducts 15, e.g. in a reservoir tank 22.

The ink is supplied through an optional filter 24 and the supply ducts 15 to the nozzles 4.

If there are suction ducts 16, they are connected to a suction system, which may comprise a second pressure control 26 for generating a second defined pressure p2 at the exit of the suction ducts 16, e.g. in a suction tank 28. The suction system may also comprise a pump. This may in particular be pump 18 as mentioned above, in which case pump 18 acts as a circulating pump.

A suitable pump design is e.g. shown in U.S. Pat. No. 6,631,983.

Providing ink supply ducts 15 to feed ink to the nozzle and ink suction ducts 16 to retrieve ink from the nozzles, allows to maintain a reservoir of fresh ink at each nozzle 4.

As further shown in FIG. 1, the print head may comprise a circuit carrier 30, such as a PCB, arranged at the back side of nozzle carrier 6.

An optional interposer layer 32 may be provided between circuit carrier 30 and nozzle carrier 6 for matching a denser resolution of the vias 14 to the circuit resolution of circuit carrier 30. Such interposer layers are e.g. used in flip-chip designs where semiconductor chips are applied to PCBs.

Circuit carrier 30 carries control circuitry 33, which may e.g. implement at least part of voltage supply 17, such as thedriver stage of such a voltage supply, which connects voltage sources to the various electrodes of the print head.

In the shown embodiment, the ink ducts 15, 16 extend through interposer layer 32 (if present) as well as circuit carrier 30.

If the vias 14 have a large enough mutual spacing (e.g. larger than 0.4 mm), they may directly interface with circuit carrier 30 without an interposer layer 32.

Advantageously, target 2 is arranged on an acceleration electrode 34, which is connected to voltage supply 17 to generate an accelerating electrical field between print head 1 and target 2.

The pressure controls 20, 26 advantageously allow to separately adjust the pressures in the supply ducts 15 as well as in the pressure ducts 16.

The printing system further comprises a first gas source 33 adapted to feed a gas to first gas ducts 34. At least one evaporator 35 is arranged along first gas duct 34 to saturate (or at least partially saturate) the gas with a suitable liquid as mentioned above and described in more detail below. The first gas ducts 34 have at least one first end 34-1 at first gas source 33 and feed gas to second ends 34-2 located at the nozzles 4.

The system may further comprise a second gas source 36 adapted to feed a gas to second gas ducts 37. The gas provided by second gas source 36 may be the same kind of gas as or a different kind of gas than the gas provided by first gas source 33, but second gas ducts 37 do not pass along the evaporator(s) 35. The second gas ducts 37 have at least one first end 37-1 at gas source 36 and feed gas to second ends 37-2 located at front surface 7 of print head 4.

Finally, the system may comprise a gas sink 38 adapted to suck gas from third gas ducts 39. The third gas ducts 39 retrieve gas from first ends 39-1 located at front surface 7 and feed it to at least one second end 39-2 at gas sink 38.

Both, the second gas source 36 and second gas ducts 37 as well as the gas sink 38 and the third gas ducts 39 are optional.

The functions of the gas sources 33, 36, the gas sink 38, and the various gas ducts 34, 37, 39 are described in the following section.

Ventilation System

The gas sources 33, 36, the gas sink 38, and the gas ducts 34, 37, 39 form part of a ventilation system of the printing system.

The function of first gas source 33 and first gas ducts 34 is to bring saturated gas to the nozzles 4, i.e. gas that has a large amount of liquid dissolved therein, such that the evaporation of ink solvent at the nozzles 4 is reduced as described above.

For this purpose, first gas source 33 may e.g. be a pump or a pressurized vessel adapted to feed a gas into the first end(s) 34-1 of the first gas ducts 34. This gas may e.g. be air. It may also be a gas specifically designed to withstand the high electric fields between the electrodes of print head 3, such as $SF_6$ or $C_4F_8$, or a mixture thereof.

In more general terms, the present invention advantageously relates to a first gas source 33 providing a gas quenching electric discharges, e.g. by having a breakdown voltage, relative to air, of at least 2. For example, the breakdown voltage of $SF_6$ is 3 relative to air, the one of $C_4F_8$ is 3.6. The invention also relates to feeding such a gas, by means of at least some of the gas sources 33, 36, into the first and/or second gas ducts 34, 37.

Typically, the first gas ducts 34 branch and end in a plurality of second ends 34-2, one of which is shown in FIG. 1. These second ends 34-2 are located at the recesses 5, thereby filling the recesses 5 with the saturated gas and protecting the nozzles 4 from evaporation by displacing non-saturated gas entering the recesses 5 from region 9. Advantageously, the saturated gas is loaded with gaseous solvent at an equivalent temperature as the one the nozzle is kept at. In this way, the concentration of gaseous solvent contained in the saturated gas is equivalent to the vapor pressure of the solvent at the nozzle location.

To prevent condensation of solvent from the saturated gas, the portions of the first gas ducts 34 that follows the location of the evaporator 35 are preferably kept at a temperature that is not lower than the temperature at which the gas loading is executed within the evaporator 35.

The second gas ducts 37 (if present) branch, too, and end in a plurality of outlets 37-2 in front surface 7, one of which is shown in FIG. 1.

Similarly, the third gas ducts 39 (if present) branch and end in a plurality of inlets 39-1 in front surface 7, one of which is again shown in FIG. 1.

The second gas ducts 37 can be used to feed dry air into the region 9 between print head 3 and target 2. Such dry gas (i.e. gas that has low saturation for the solvents in the used ink), expedites thedrying of the ink on target 2.

The third gas ducts 39 can be used to withdraw the gas that the first and second gas ducts have introduced into region 9, thereby reducing the amount of lateral gas flow in region 9 as mentioned above.

Advantageously, the invention therefore relates to a method comprising the step of feeding a first flow of gas through a first subset of the gas ducts (namely the subset of the gas ducts 34 and, if present, 37) to the region 9 and retrieving a second flow of gas through a second subset of the gas ducts (namely the third gas ducts 39), with the first and the second gas flows being equal, in particular within an accuracy better than 5%.

The gas fed from second gas source 36 through the second gas ducts 37 is, advantageously, again a gas with a high breakdown voltage as defined above, thereby reducing the risk of electrical breakdown between electrodes of the print head.

Alternatively, or in addition, the gas from second gas source 36 can be an inert gas or it can be a reactive gas that reacts with solute. Such gas will not react with solute at the nozzle region if the gas introduced from the second ends 34-2 is an inert gas and displaces the reactive gas introduced from the second gas ducts 37 from the recesses 5. Instead, the reaction will only occur on the substrate or during droplet flight.

Hence, advantageously, the method of the present invention advantageously comprises the following steps:

- Feeding a first gas from first gas source 33 through the first gas ducts 34 to the nozzles (4);
- Feeding a second gas from second gas source 36 through the second gas ducts 37 to the region 9 between print head 3 and target 2.

In this case, the gasses from first gas source 33 and second gas source 36 may be different (i.e. different even before the first gas passes the evaporator(s) 35).

Advantageously, the first gas is an inert gas for the ink (i.e. there is no chemical reaction at the printing conditions between the first gas and the ink) while the second gas chemically reacts with the ink (i.e., at the printing conditions, there is a chemical reaction between the second gas and the ink).

For example, the first gas may consist of at least one of: nitrogen, carbon dioxide, and a noble gas. The second gas may comprise oxygen. When an oxidizing ink is used, drying by oxidation can be used to expedite thedrying process. Oxidizing inks are known to the skilled person, see e.g. http://printwiki.org/Oxidation. A reaction on the substrate may be further enhanced by increased the substrate temperature, while the print head can be kept at a reference temperature.

Print Head Design Overview

Figure 2:
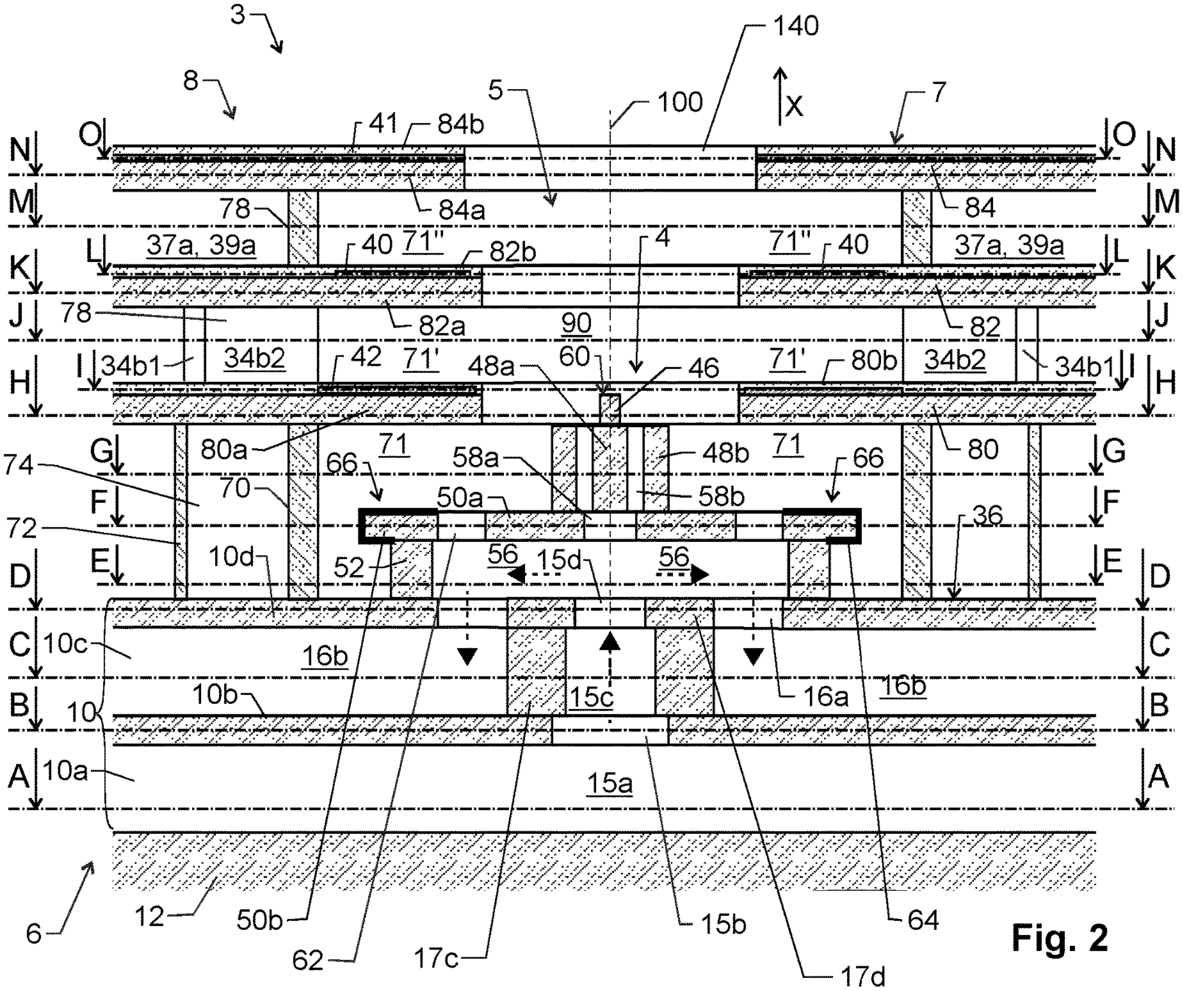
FIG. 2 is a vertical sectional view through an embodiment of the print head at the location of a nozzle.

FIG. 2 shows a sectional view of print head 3 at a nozzle 4. (As mentioned above, in contrast to FIG. 1, the ejection direction X in FIG. 2 points upwards.) FIGS. 3-17 show sectional views, perpendicular to ejection direction X, along the lines A-A to O-O of FIG. 2.

As can be seen from FIG. 2, nozzle 4 forms a projection on the front side 36 of nozzle carrier 6, e.g. on the front side of its front layer 10. It sits at the base of its recess 5.

FIG. 2 also shows the various electrodes that may be associated with the nozzles 4. They are described in the following.

Figure 14:
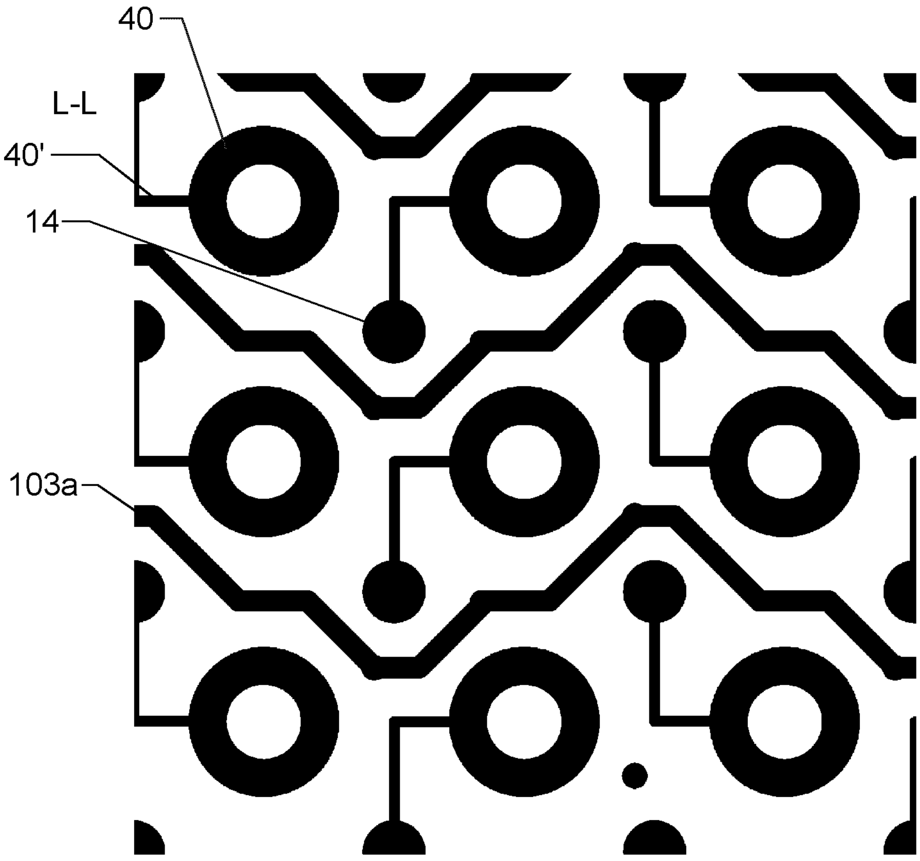
FIG. 14 is a horizontal sectional view along line L-L of FIG. 2.

The ejection electrode 40 is located on the front side of the nozzle 4. In the embodiment of FIGS. 2 and 14, it is annular with a central opening (at the location of recess 5) for the passage of the ink. Each ejection electrode 40 is connected, e.g. by means of a lead 40' (see FIG. 14), to one of the vias 14, which extend through support structure 8 and nozzle carrier 6 as described on more detail below.

FIG. 14 also shows electrical leads 103*a*, arranged at the same level as the ejection electrodes 40, for feeding a voltage to thedeflection electrodes 41*c* mentioned below in the next paragraph by means of vias 103*b* shown in FIG. 15. The vias 103*b* are coated with dielectric layers 103*c* to reduce the risk of electrical breakdown.

Figure 17:
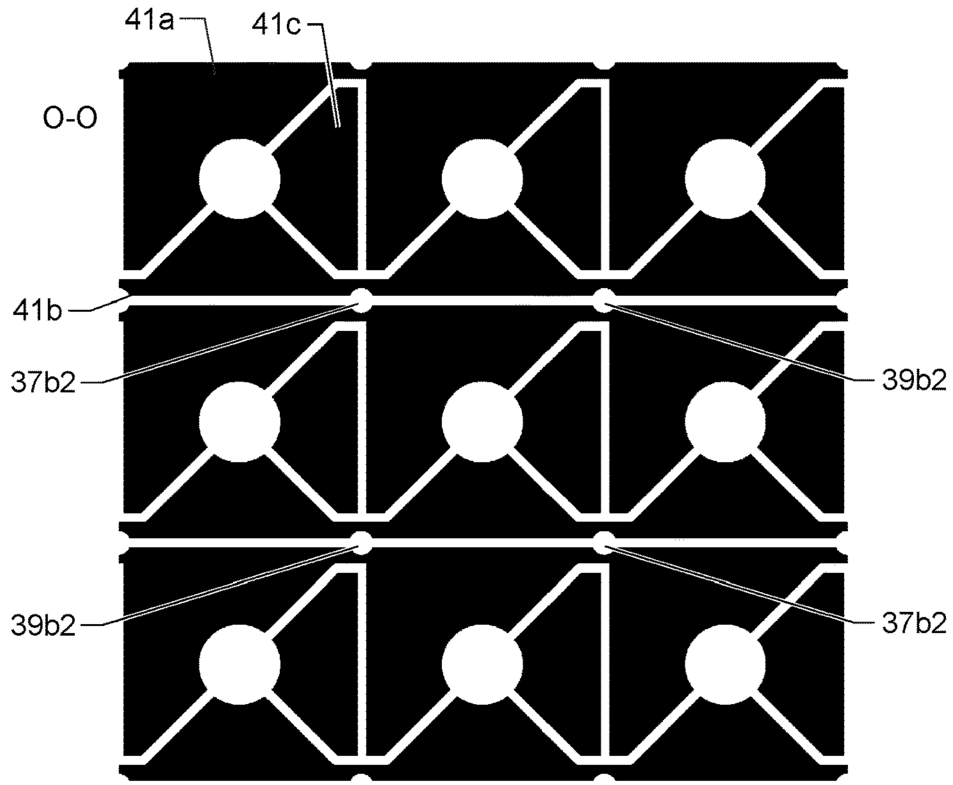
FIG. 17 is a horizontal sectional view along line O-O of FIG. 2.

Turning to FIGS. 2 and 17, a shielding electrode 41 may be located at the front side of and at a distance from the ejection electrodes 40, i.e. the ejection electrodes 40 are closer to nozzle carrier 6 than the shielding electrode 41.

As shown in FIG. 17, shielding electrode 41 may comprise several electrically separate sections 41*a*, 41*b*, 41*c*, which allows to laterally deflect the ink drops exiting from recess 5. Alternatively, it may be one continuous electrode, with the main purpose to prevent the fields from the ejection electrodes from propagating into region 9 between print head 3 and target 2 and to generate a well-defined gradient field between print head 3 and target 2.

If several separate sections 41*a*, 41*b*, 41*c* are used, they may be applied to different potentials, e.g. by applying a voltage gradient across the array of nozzles by means of a voltage divider, which e.g. allows to gradually deflect the ink over a cross section of the print head.

Shielding electrode 41 is provided to control the field between print head 1 and target 2. For each nozzle 4, an opening in shielding electrode 40 allows for the passage of the ink. This opening corresponds to recess 5.

Figure 11:
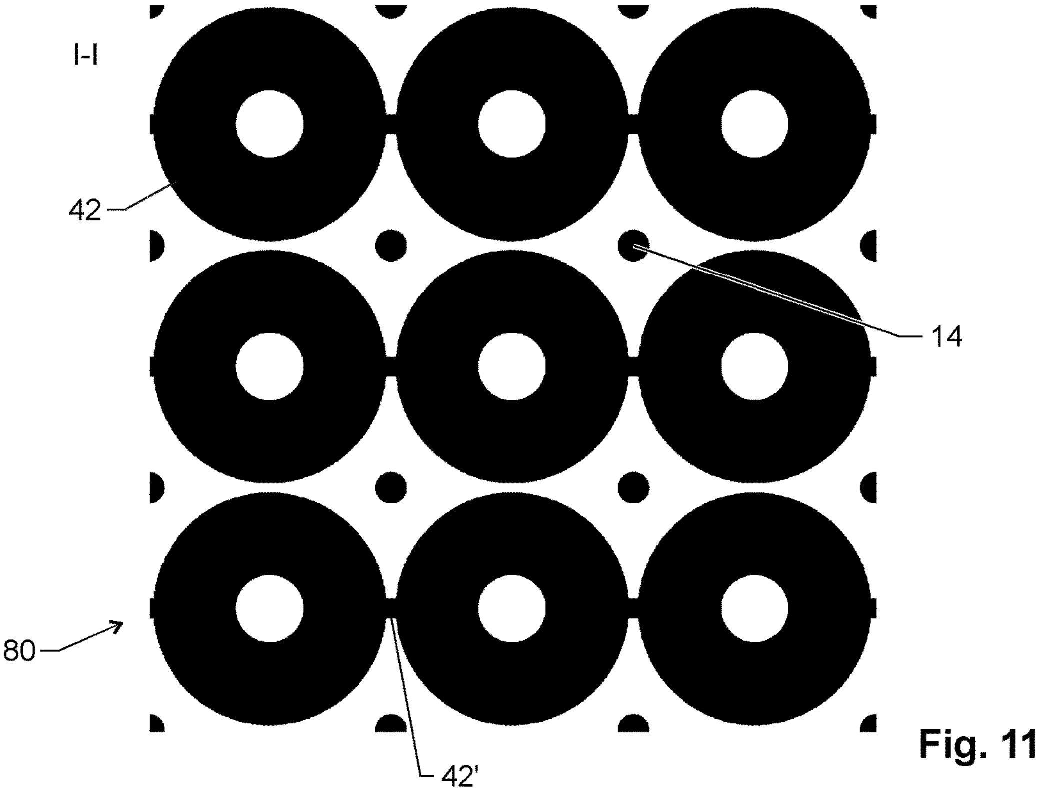
FIG. 11 is a horizontal sectional view along line I-I of FIG. 2.

As shown in FIGS. 2 and 11, a guard electrode 42 may be located, at each nozzle 4, behind and at a distance from ejection electrode 40 but in front of and at a distance from nozzle carrier 6. As shown in FIGS. 2 and 11, it may again be annular. Alternatively, it may also extend over several nozzles. Since all guard electrodes 42 are on the same potential, they can e.g. be interconnected, with leads 42' as shown in FIG. 11, and be connected to voltage supply 17 e.g. by means of separate vias in the periphery of print head 3.

An opening in guard electrode 42 above nozzle 4 (corresponding to recess 5) allows for the passage of the ink.

The guard electrodes 42 reduce the electrical fields at the base of nozzle 4, thereby reducing the tendency of the ink to cross the retainer described below, which allows to localize it more securely in base of recess 5. This is described in more detail below.

Ink System

In the present embodiment, ink arrives at the nozzles through the ink supply ducts 15, which comprise ink duct sections 15*a*-15*d* located in sublayers 10*a*-10*d* of front layer 10. And ink is retrieved from the nozzles through the ink suction ducts 16, which comprise ink duct sections 16*a*, 16*b* in sublayers 10*d* and 10*c*.

Figure 3:
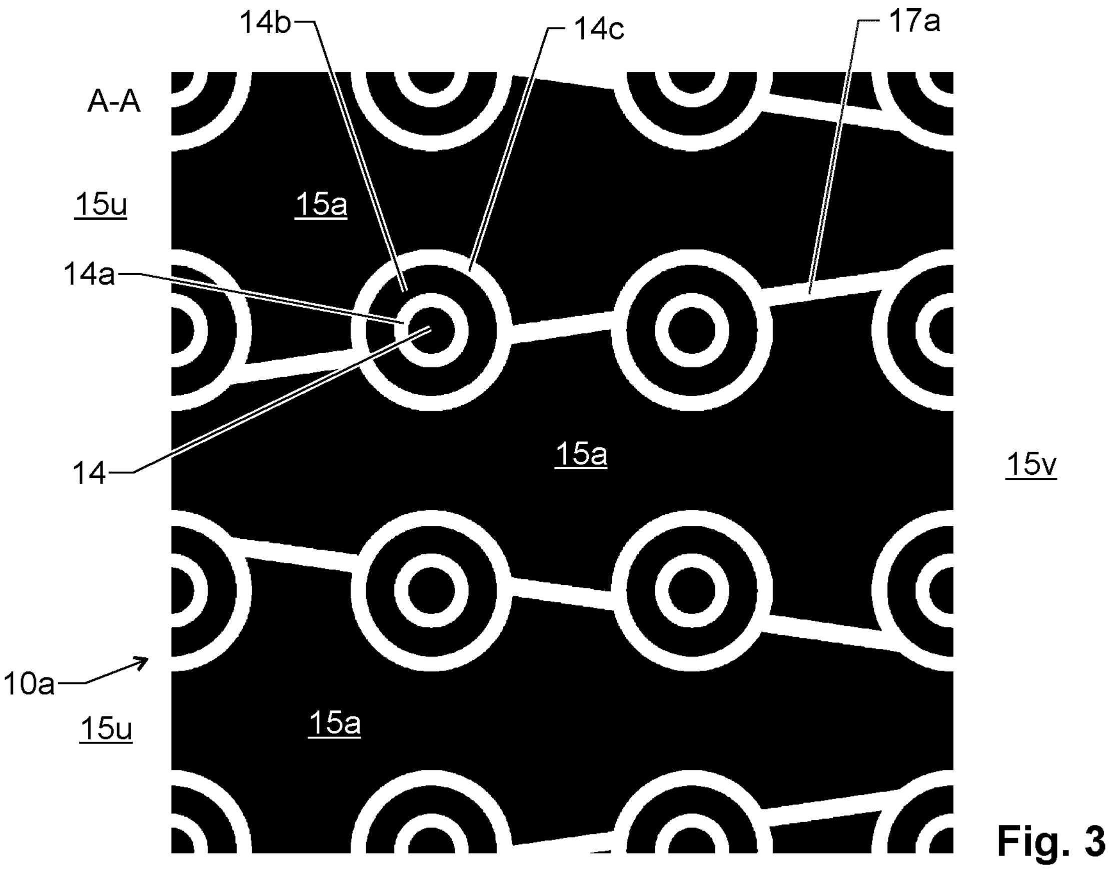
FIG. 3 is a horizontal sectional view along line A-A of FIG. 2.
Figure 19:
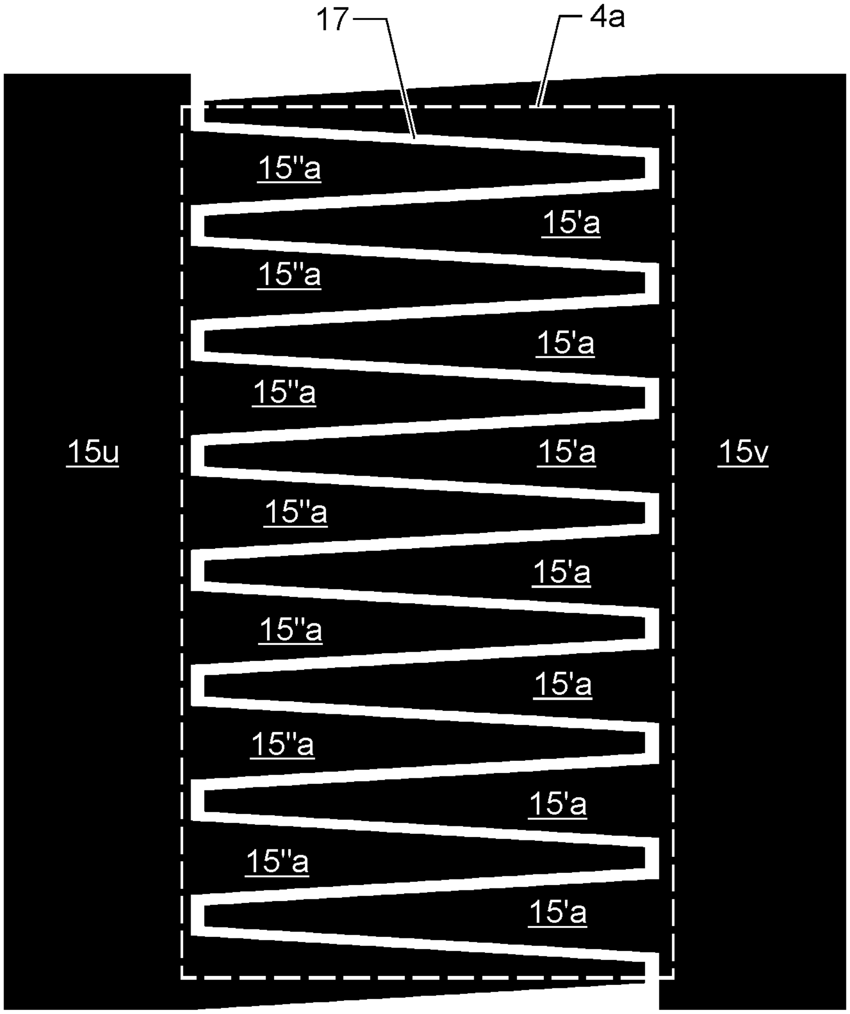
FIG. 19 is a schematic representation of the shape of the duct sections across the print head.

As shown in FIGS. 2 and 3, the first ink duct sections 15*a* are located in sublayer 10*a* and are separated by walls 17*a* and extend horizontally through sublayer 10*a*. In the shown embodiment, it is assumed that they feed ink from reservoir sections 15*u*, 15*v* at the left and right of the shown figure, with each such reservoir section 15*u* and 15*v*, which interconnect the ends of several of the first ink duct sections 15*a*. The geometry of this design is illustrated in FIG. 19, which shows the reservoirs 15*u*, 15*v* as well as the first gas duct sections 15*a* (named 15'*a* and 15"*a* in FIG. 19) branching off from the reservoirs 15*u*, 15*v*.

When viewing print head 3 from above, the array 4*a* of nozzles 4 (shown in dotted lines in FIG. 19) is located laterally between the reservoirs 15*u*, 15*v*

The cross sections of the first ink duct sections 15*a* change along their length: With increasing distance from the reservoir 15*u*, 15*v* they are connected to, the cross sections of the first ink duct sections 15*a* decrease, thereby taking into account that the ink flow in the ink duct sections 15*a* decreases as ink is branched off from the first ink duct sections 15*a* into the second ink duct sections 15*b*.

The reservoirs 15*u* and 15*v* are connected, by means of larger diameter ink duct sections (not shown), to the ink source, such as reservoir tank 22 of FIG. 1.

Note that the principle depicted in FIGS. 3 and 19, with the narrowing ducts sections, can also be applied for other duct sections the print head 3, be they ink duct sections or gas duct sections. Examples will be provided below.

Hence, in a more general formulation, the present invention advantageously also relates to a printing system having a print head with duct sections for gas or ink. The duct sections extend parallel to the front surface 7 of the print head and branch off from at least one common reservoir 15*u*, 15*v*, with the common reservoir(s) 15*u*, 15*v* also arranged in the print head. The cross section of the duct sections decreases with increasing distance from the reservoir(s), either continuously (as shown in FIGS. 3 and 19), or in a step-wise manner (e.g. wherever another second duct section 15*b* branches off).

In particular, there is at least a first reservoir 15*u* and a second reservoir 15*v* arranged at opposite lateral sides of the array 4*a* of ink nozzles. When seen from above and as shown in FIG. 19, a first set 15"*a* of ducts extends from the first reservoir 15*u* into the array 4*a* and a second set 15'*a* extends from the second reservoir 15*u* into the array 4*a*, with the two sets arranged interdigitally (i.e. alternatingly).

Note that the narrowing of the duct sections 15*a* in FIGS. 3 and 19 is shown in exaggerated manner.

Sublayer 10*a* is advantageously comparatively thick, advantageously at least 20 μm, in order to provide large cross sections for the ink ducts.

FIG. 3 also shows the vias 14 that are connected to the ejection electrodes 40. In the present example, there is one such via for each nozzle, which allows to control the ejection electrodes 40 individually.

The vias 14 in FIG. 3 (and in the other figures showing horizontal sectional views) may e.g. be implemented as solid, vertical metal rods or as a metal coatings on the inner wall of the surrounding dielectric.

As can be seen from FIG. 3, each electrical via 14 is laterally surrounded by a non-conducting wall 14*a* formed by sublayer 10*a*, which is in turn surrounded by a cavity 14*b* and yet another wall 14*c*.

Laterally surrounding the vias 14 first by a dielectric wall 14*a* and then by a cavity 14*b* increases the electrical breakdown threshold of the structure. Most of the electrical potential (e.g. in respect to a neighboring via and/or the neighboring ink) will drop over the cavity (because it has a lower dielectric permittivity than thedielectric). Hence, thedielectric is protected from structural damage. On the other hand, if there were no wall, there would be a risk of an ionic breakdown through the gas. Hence, the combination of a dielectric coating of the electrode and a cavity surrounding it is advantageous.

In sublayer 10*a*, this structure is particularly important since there might be a substantial potential difference between the vias 14 and the ink in the duct sections 15*a*. It is particularly advantageous if the duct sections 15*a* are in addition covered with an electrode (not shown) that charges the liquid contained within to a defined electric potential.

As will be seen below, similar structures are provided in other layers of print head 3.

Hence, in more general terms, print head 3 advantageously comprises electrically conductive vias 14. Each of these vias 14 is laterally enclosed by a non-conductive first wall 14*a*, which is laterally enclosed by a cavity 14*b*. The cavity 14*b* may in turn also be laterally enclosed in a non-conductive second wall 14*c*.

In the case of FIG. 3, second wall 14*c* prevents the ink in the duct sections 15*a* from entering the cavities 14*b*.

Advantageously, the wall(s) 14*a*, 14*c* and cavity 14*b* have, in a plane perpendicular to the extension of via 14, circular cross-section, thereby avoiding corners that would lead to locally increased electrical field strengths.

To simplify manufacture, the vias 14 extend advantageously along the ejection direction X, i.e. perpendicular to front surface 7 of print head 3.

Note that there may be other vias in the print head, in particular vias without strong electrical fields in their neighborhood, that do not have such a cavity.

Nor do these vias 14 need to have such cavity structures along their whole length. For example, and as shown in FIG. 4, which shows a sectional view of sublayer 10*b* above sublayer 10*a* of FIG. 3, there is no cavity around the vias 14.

Hence, first and second wall 14*a*, 14*c* can be anchored, at their upper ends, in sublayer 10*b*.

Cavities may be filled with vacuum or with a dielectric gas that quenches dielectric beakdowns, e.g. SF6 or C4F8. The same strategy may be used for any other enclosed cavity in the printhead.

Figure 4:
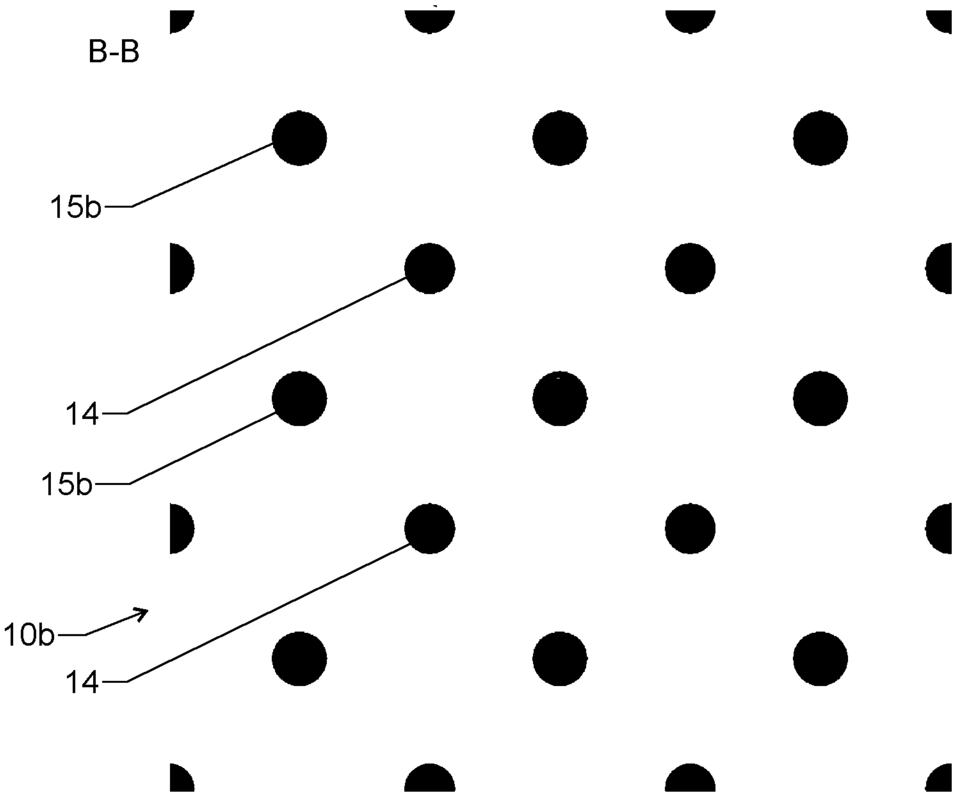
FIG. 4 is a horizontal sectional view along line B-B of FIG. 2.

FIG. 4 further shows the second ink duct sections 15*b*, which are also shown in FIG. 2, with one such second ink duct section 15*b* branching off from the first duct sections 15*a* below each nozzle 4.

Sublayer 10*b* can be thinner than sublayer 10*a*, e.g. approximately 5 μm.

Figure 5:
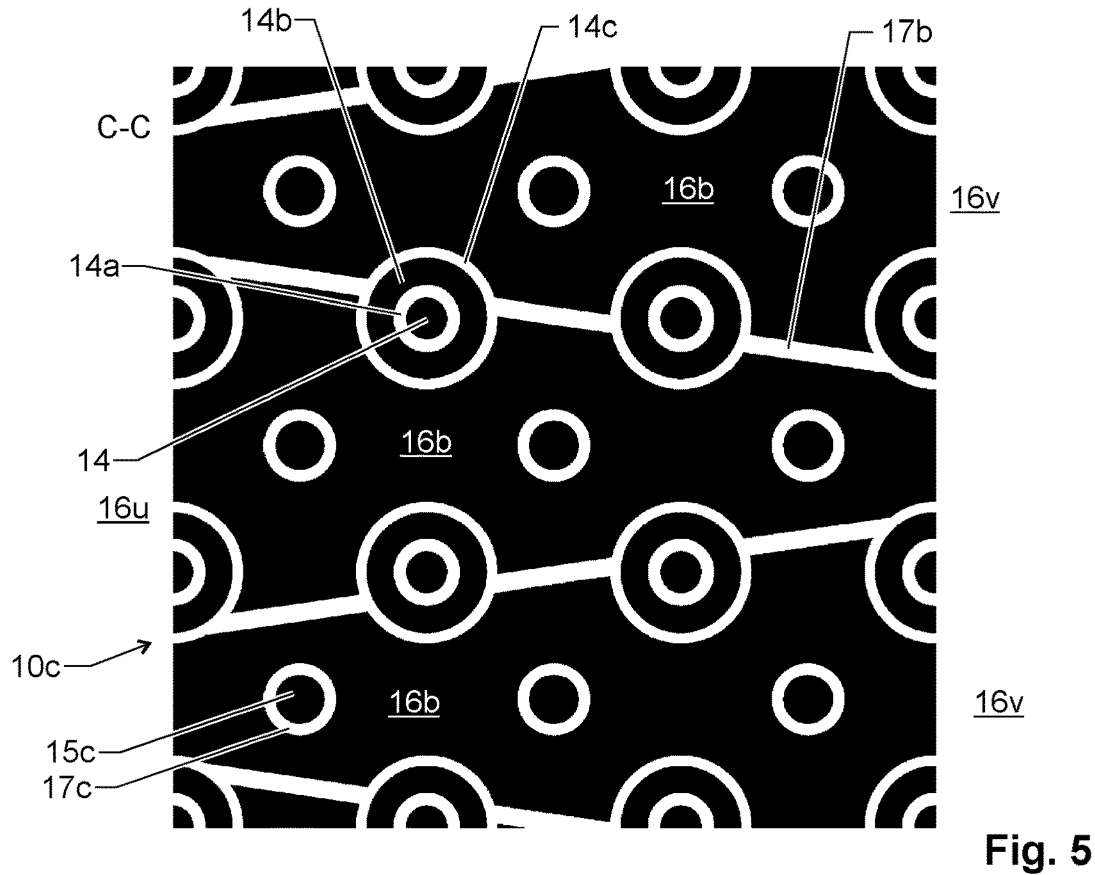
FIG. 5 is a horizontal sectional view along line C-C of FIG. 2.

FIGS. 2 and 5 show the ink duct sections 16*b* of ink suction duct 16 formed in sublayer 10*c*. The design of this sublayer 10*c* is similar to the one of sublayer 10*a* in that the ink duct sections 16*b*, separated by walls 17*b*, extend horizontally to feed ink to lateral reservoirs 16 and 16*v*. Again, and as depicted for the ink duct sections 15*a* in FIG. 19, their cross sections decrease with increasing distance from the reservoirs 16*u*, 16*v*, and they are arranged interdigitally.

Sublayer 10*c* is, again, advantageously comparatively thick, advantageously at least 20 μm, in order to provide large cross sections for the ink duct sections 16*b*.

FIG. 5 shows that the vias 14 are again surrounded by first and second walls 14*a*, 14*c* and a cavity 14*b*.

FIG. 5 further shows the duct sections 15*c* with surrounding walls 17*c* that communicate with the duct sections 15*b* of the ink supply ducts 15.

Figure 6:
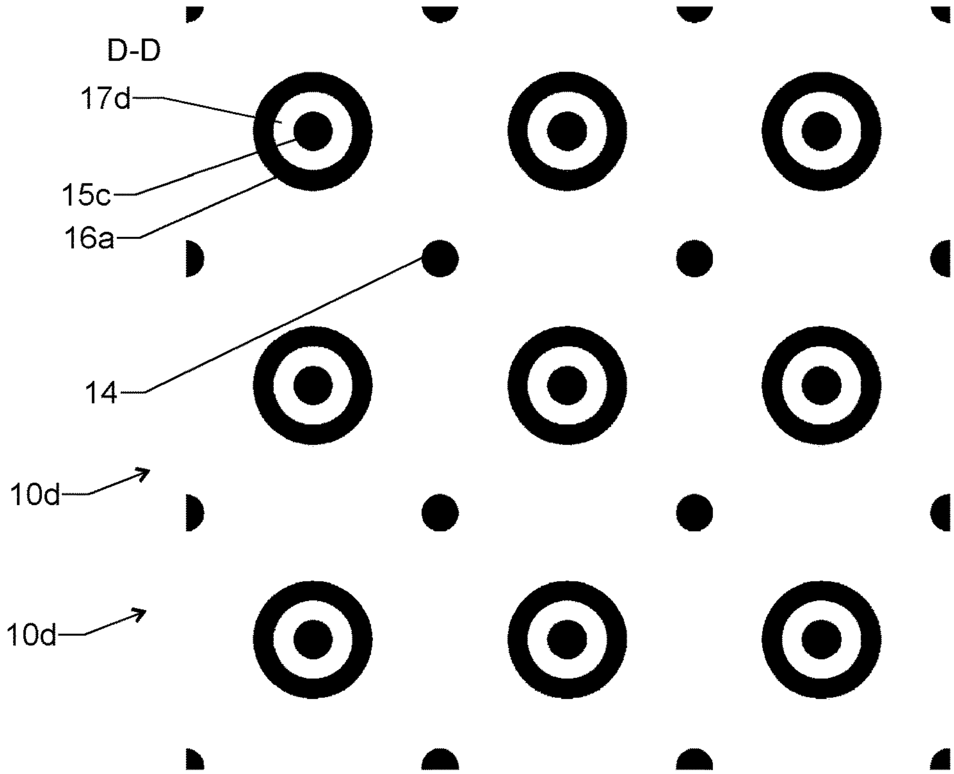
FIG. 6 is a horizontal sectional view along line D-D of FIG. 2.
Figure 7:
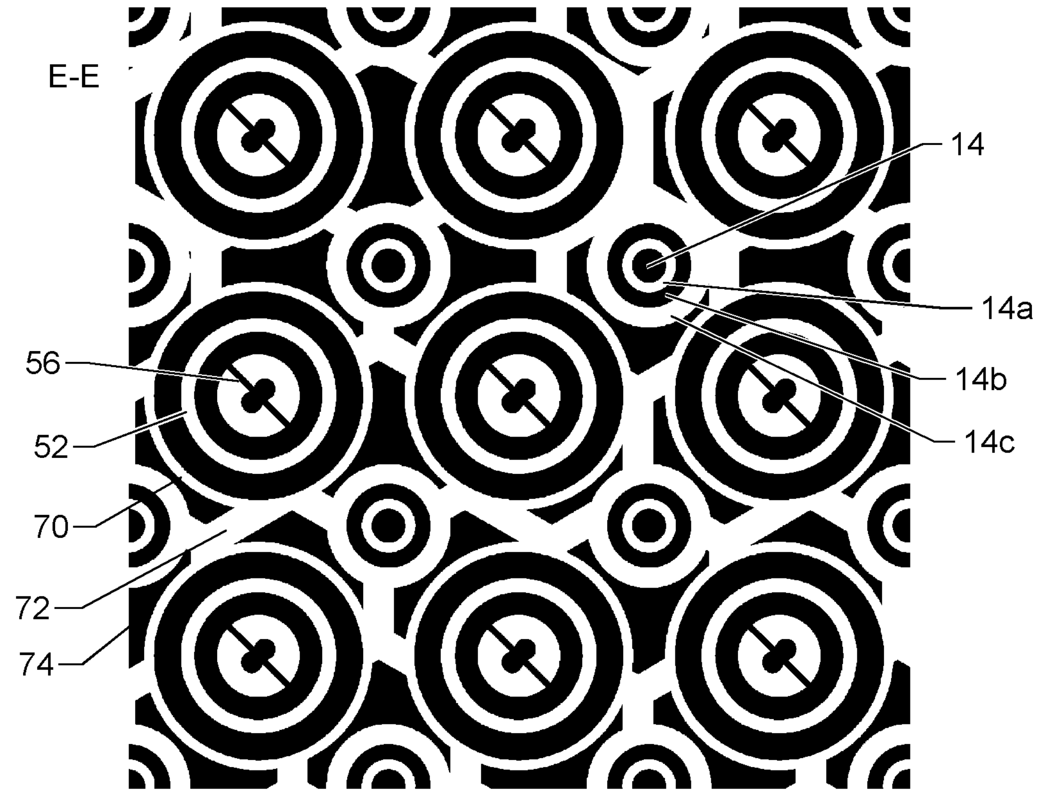
FIG. 7 is a horizontal sectional view along line E-E of FIG. 2.
Figure 8:
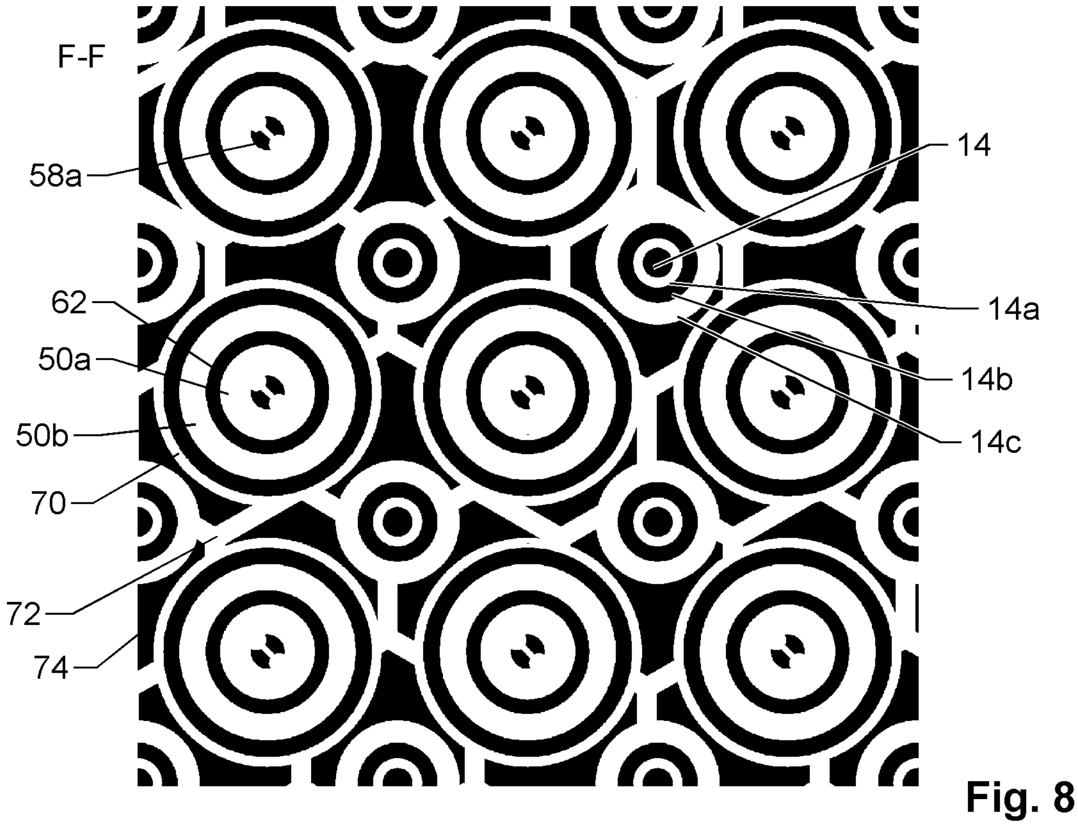
FIG. 8 is a horizontal sectional view along line F-F of FIG. 2.
Figure 9:
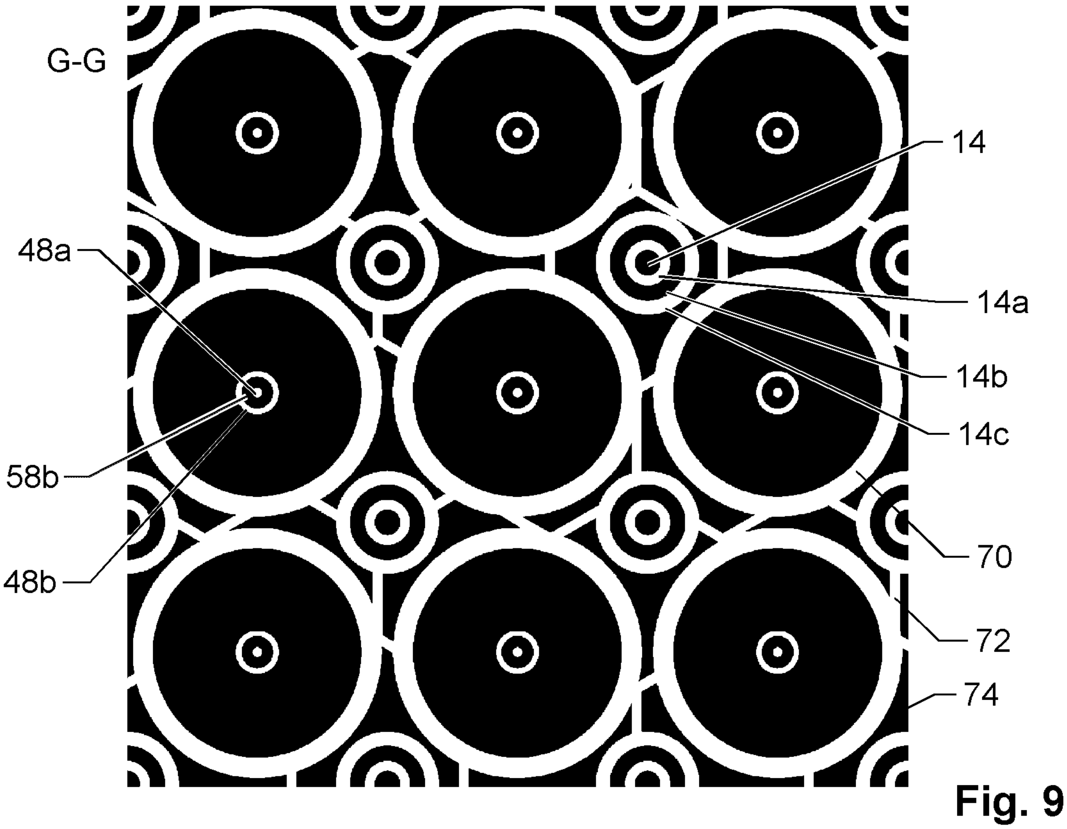
FIG. 9 is a horizontal sectional view along line G-G of FIG. 2.
Figure 10:
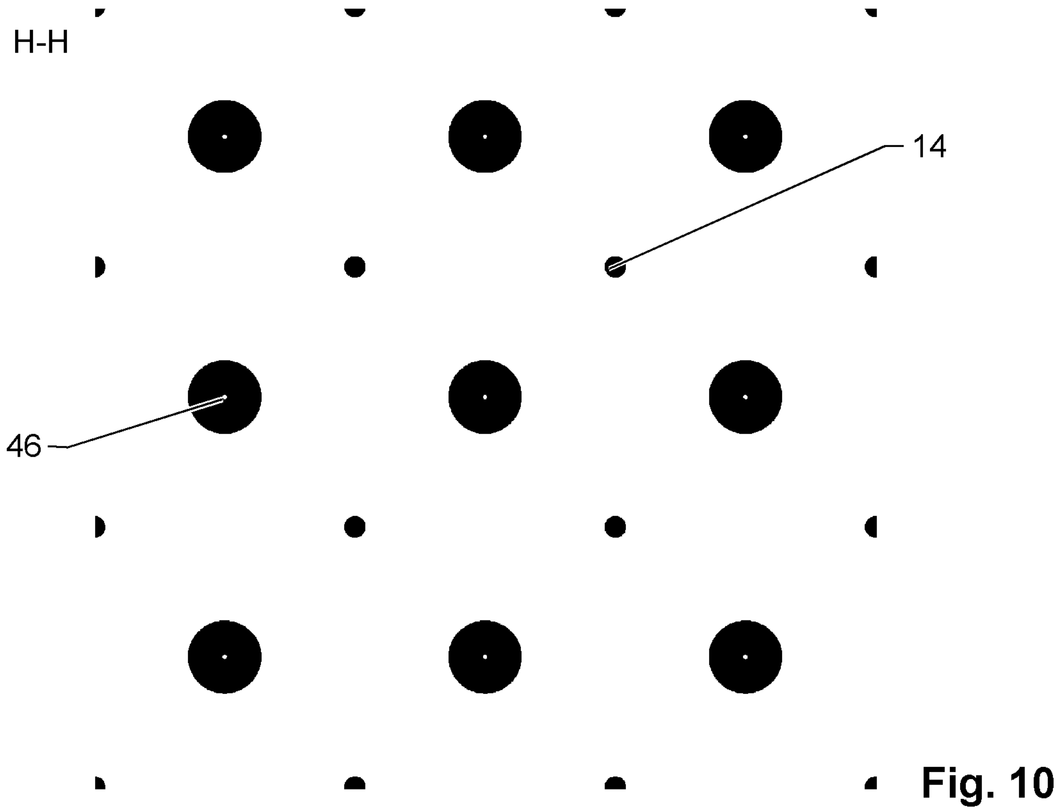
FIG. 10 is a horizontal sectional view along line H-H of FIG. 2.

As can be seen from FIGS. 2 and 6, sublayer 10*d* forms a wall 17*d* between ink duct section 15*d* of ink supply duct 15 and ink duct section 16*a* of ink suction duct 16.

Sublayer 10*d* can be thinner than sublayers 10*a* and 10*c*, e.g. approximately 5 μm.

Nozzle Design

The design of the nozzles 4 can best be seen in FIGS. 2 and 7-10.

Nozzle 4 of this embodiment comprises a tip section 46, a shaft section 48*a*, 48*b*, and a base section 50*a*, 50*b*, 52, with tip section 46 arranged in front of shaft section 48*a*, 48*b*, and base section 50*a*, 50*b*, 52 arranged behind shaft section 48.

The shown nozzle design relies on the ink wetting the lateral surface of nozzle 4 and passing through a channel of nozzle 4, but a design e.g. as shown in WO 2016/169956 can be used as well.

The present nozzle 4 comprises a radial channel 56 in its base as well as vertical channels 58*a*, 58*b* extending into through its shaft section 48*a*, 48*b* to the rear end of tip section 46. (Note that, in FIG. 2, radial channel 56 is rotated by 45° as compared to FIG. 7.)

From the upper end of channel 58, the ink wets sides of tip 46 and forms a meniscus at the top 60 of tip 46. In this way, a sharp meniscus-like ink geometry is formed already before applying any voltages to the print head, merely by the action of surface tension. Accordingly, the tip is preferably rendered wettable to the solvent being used. This can be achieved, for example, by activating the tip surface with an oxygen plasma.

Radial channel 56 guides ink outwards to an annular opening 62 at the top of base 50*a*, 50*b*, 52. Annular opening 62 is arranged between a central section 50*a* and a peripheral section 50*b* of the base of nozzle 4.

From annular opening 62, ink can wet the shaft section of nozzle 4, further adding to the ink that is available at tip 46.

Peripheral section 50*b* may be coated with an anti-wetting coating 64 and forms an ink retainer 66 that prevents ink from laterally spreading over the nozzle. Depending on the ink to be used, coating 64 may be hydrophobic and/or oleophobic. For example, it may be formed, at least in part, of Teflon and/or PTFE, which are hydrophobic and oleophobic. Depending on the scope of inks to be used, it may also be only hydrophobic (e.g. HMDS, i.e. Bis(trimethylsilyl)amine) or only be oleophobic (e.g. based on polymers). In particular, the surface of ink retainer 66 is advantageously more hydrophobic and/or oleophobic than a surface of shaft 48*a*, 48*b* of nozzle 4.

As mentioned above, guard electrode 42 keeps the electric fields at the location of retainer 66 low, thereby further reducing the tendency of the ink to spread over retainer 66.

Each nozzle 4 is advantageously surrounded by the opening or openings 16*a* of one or more suction ducts. This may e.g. be a single annular opening (such as formed by duct section 16*a* of FIG. 2), or it may be an annular series of suction openings, e.g. circular openings.

Further, each nozzle 4 of the shown embodiment is surrounded by an annular wall 70 of support structure 8. Further support elements 72 may be provided to support the upper parts of support structure 8. For example, these further support elements 72 may be structured in a hexagonal pattern of walls 72 surrounding cavities 74. This kind of wall design minimizes mechanical stress in the structure.

Support Structure

As mentioned, a support structure 8 is provided for connecting the various electrodes 38, 40, 42 to nozzle carrier 6. It is arranged on front side 36 of nozzle carrier 6.

Support structure 8 comprises a plurality of support elements, such as the support elements 70, 72, arranged between the nozzles 4.

Ink retainer 66 is advantageously designed to prevent ink from reaching these support elements of the support structure and to prevent it from wetting them, thereby reducing the tendency of the ink to submerge the nozzles.

Support structure 8 advantageously comprises at least one electrode carrier layer. In the embodiment of FIG. 2, there are three such carrier layers 80, 82, 84. Each electrode carrier layer comprises at least one of the electrodes 38, 40, 42, and it extends parallel to top surface 36.

Typically, the electrode 38, 40, 42 is embedded within its electrode carrier layer 80, 82, 84 and covered on its front and back sides by at least one dielectric sublayer 80*a*, 80*b* or 82*a*, 82*b* or 84*a*, 84*b*.

In the embodiment shown here, support elements 70, 72, 76 and/or 78 are provided between each of the electrode carrier layers 80, 82, 84 as well as between the backmost electrode carrier layer 80*a* and nozzle carrier 6. They may, however, also only be provided between a subset of these structures.

Gas Ducts

In the present embodiment, the gas ducts 34, 37, 39 of the ventilation system (as described above) comprise gas duct sections arranged in the upper sublayers of support structure 8.

Figure 12:
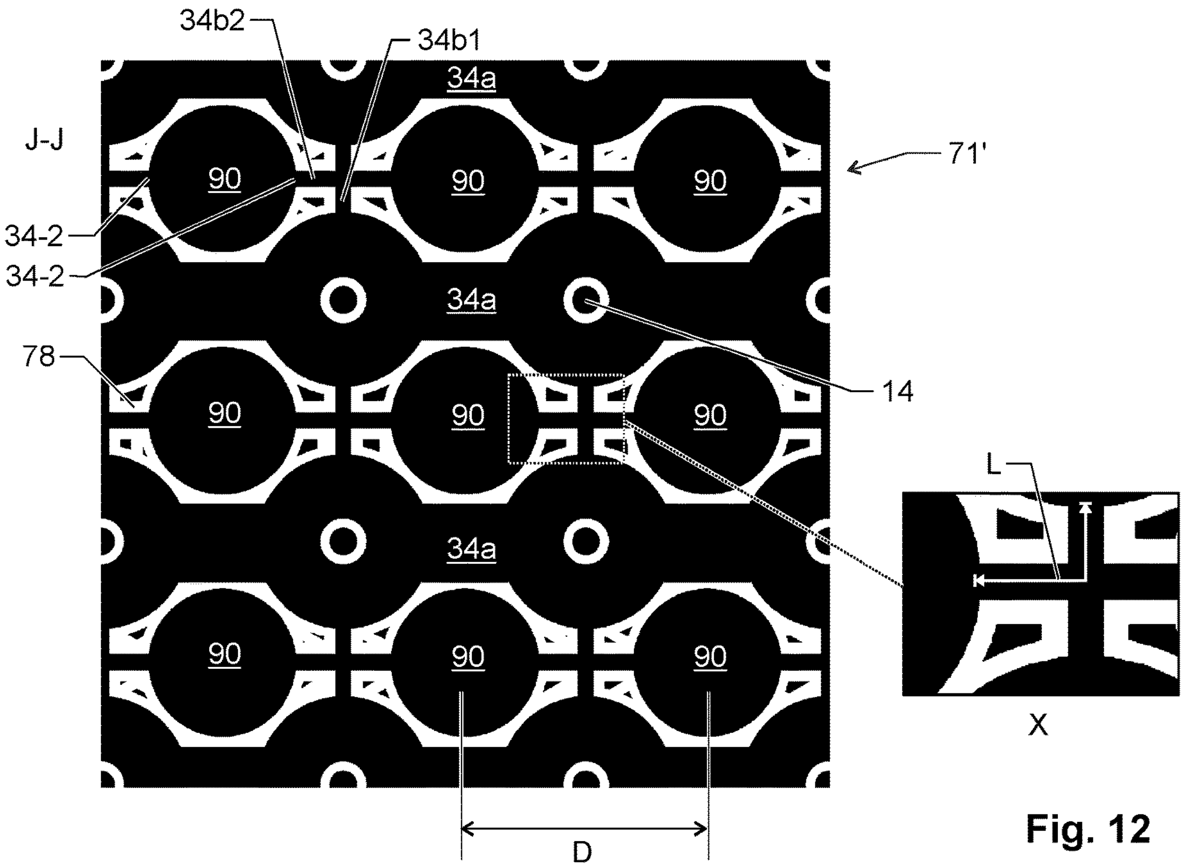
FIG. 12 is a horizontal sectional view along line J-J of FIG. 2.
Figure 13:
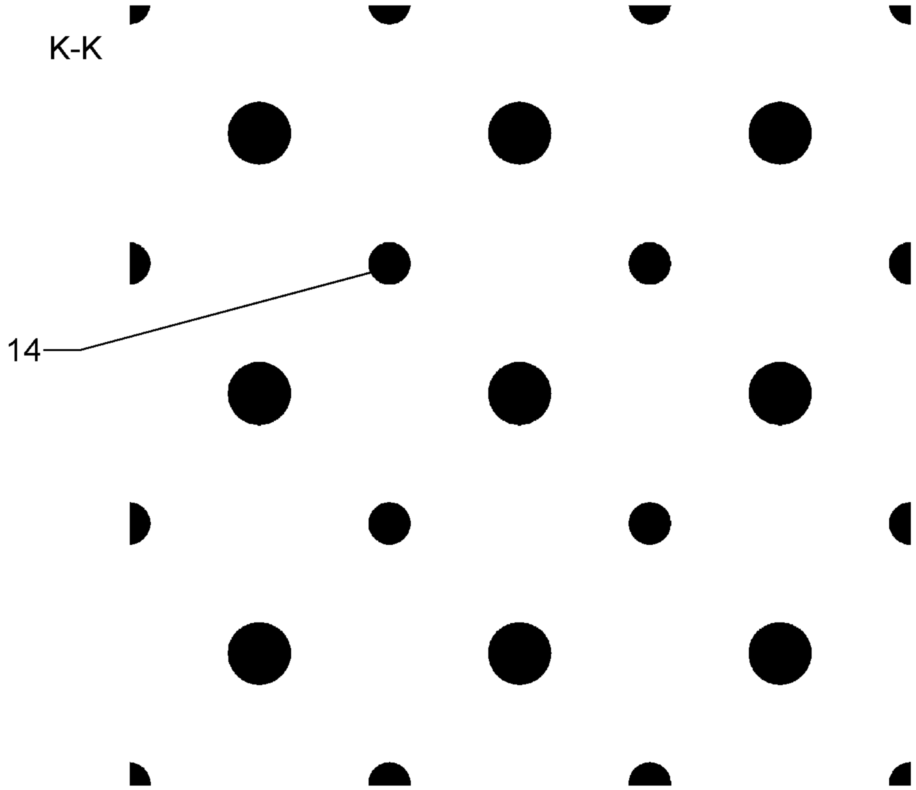
FIG. 13 is a horizontal sectional view along line K-K of FIG. 2.

In the shown embodiment, a set of first set of gas duct sections, in the following called the "primary gas duct sections" 34*a*, are arranged a sublayer 71' of support structure 8 between the carrier layers 80 and 82. This is shown in FIGS. 2 and 12.

These primary gas duct sections 34*a* extend through print head 3 parallel to front surface 7. The e.g. feed gas from larger duct sections (not shown) at the periphery of print head 3, which are in turn connected to first gas source 33. In the shown embodiment, there is a plurality of primary gas duct sections 34*a*, which extend parallel to each other and parallel to rows of the array of nozzles 4.

At each of the nozzles 4, they branch into secondary gas duct sections 34*b*1, 34*b*2 and feed gas to a mixing region 90 located in recess 5. The cross sections of the secondary gas duct sections 34*b*1, 34*b*2 are at least 5 times, in particular at least 10 times, smaller than the cross sections of the primary gas duct sections 34*a* in order to provide substantially the same gas flow to all nozzles 4 along the length of the primary duct sections 34*a* by rendering the maximum pressure drop over the whole primary duct sections 34*a* much smaller (in particular at least 10 times smaller) than the maximum total pressure drop over the secondary duct sections 34*b*1, 34*b*2.

To expedite this, the secondary duct sections 34*b*1, 34*b*2 have a total (combined) length L (see inset X of FIG. 12) from the primary duct sections 34*a* to the mixing region 90 (i.e. to the recess 5) that is a substantial fraction k of thedistance D between two neighboring nozzles 5, i.e. L=k·D, with k at least 0.1, in particular at least 0.25.

Furthermore, the length L2 of the primary duct sections 34*a* is preferably chosen smaller than the squared ratio of the cross-sections C1 and C2 of primary duct sections 34*a* and secondary ducts sections 34*b*1, 34*b*2, multiplied by L, i.e.

$$L2<(C1/C2)^2 \cdot L$$

(For a more accurate estimate for elongate cross sections, the Darcy-Weisbach equation may be used.)

For example, if the cross-sections C1 of the primary duct sections 34*a* are ten times larger than the cross-sections C2 of the secondary duct sections 34*b*1, 34*b*2, then L2 is preferably shorter than 100 L. In this case, by additionally choosing k=0.1, one would preferably arrange less than ten nozzles between two neighboring reservoirs 15*u*, 15*v*.

The number of nozzles can be extended, though, by laterally at least duplicating the arrangement shown in FIG. 19. In this case, a given reservoir may also feed primary duct sections on two opposite sides thereof.

The ends of the secondary gas duct sections 34*b*, where they enter the mixing regions 90, form the "second ends" 34-2 of the first gas ducts 34 as mentioned above.

Advantageously, at least two of the second ends 34-2 end in each recess 5, and they are arranged in rotational symmetry around nozzle axis 100 in order to generate a symmetric flow of gas that does not laterally deflect the ink.

Hence, in more general terms, the first gas ducts 34 comprise primary and secondary duct sections 34*a* and 34*b*1, 34*b*2, wherein:

- the primary duct sections 34*a* extend through print head 3 in a direction parallel to front surface 7 and parallel to each other, and
- from each primary duct section 34*a*, a plurality of secondary duct sections 34*b*1, 34*b*2 branches off to connect the primary duct section 34 to a plurality of the recesses 5.

A particularly compact design can be achieved, as shown, if the primary duct sections 34*a* and, advantageously, also the secondary duct sections 34*b*1, 34*b*2, are incorporated into support structure 8, i.e. in ejection direction X they are located between surface 7 and nozzle carrier 6.

Advantageously, the primary duct sections 34*a* are located between the ejection electrodes 40 and nozzle carrier 6.

Also advantageously, the primary and the secondary gas duct sections 34*a*, 34*b*1, 34*b*2 are all located in the same plane parallel to surface 7, which obviates the need to manufacture vertical passages, such as passages through the carrier layers 80, 82, 84.

Figure 15:
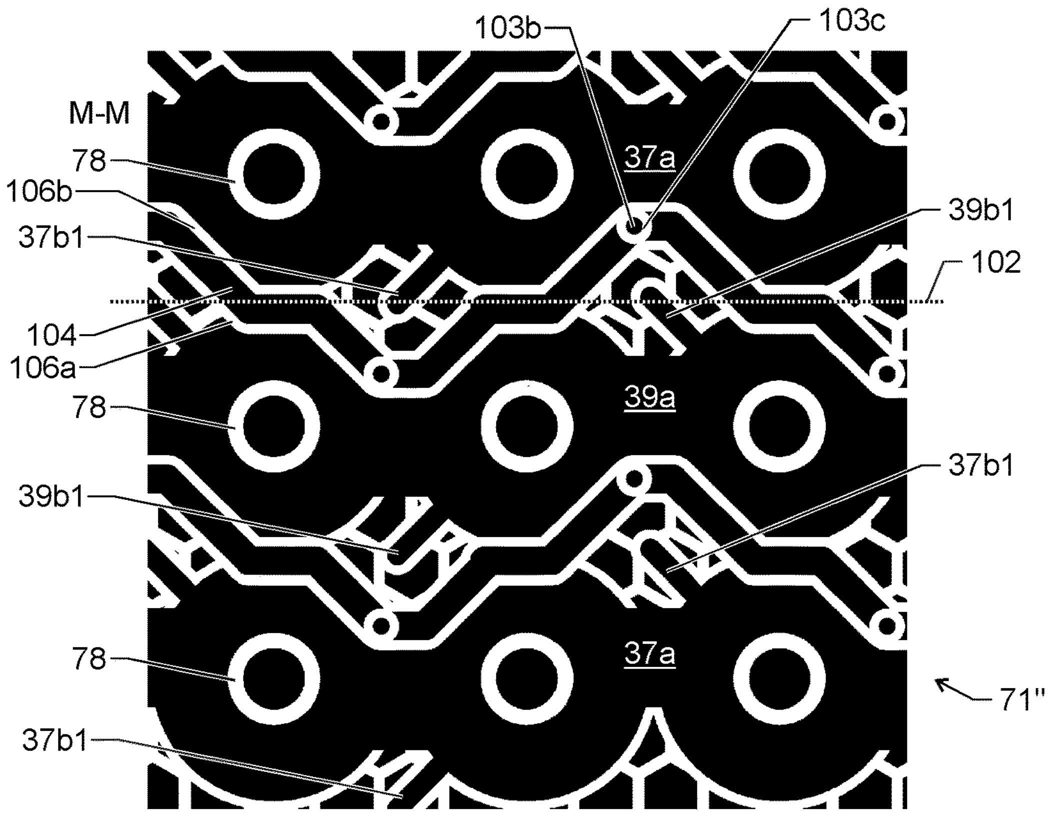
FIG. 15 is a horizontal sectional view along line M-M of FIG. 2.

FIGS. 2 and 15 illustrate the locations of the gas duct sections for the second and third gas ducts 37, 39.

Again, there are primary gas duct sections 37*a*, 39*a* as well as secondary gas duct sections 37*b*1, 37*b*2 and 39*b*1, 39*b*2, with the duct sections 37*a*, 37*b*1, 73*b*2 forming part of the second gas ducts 37 and the duct sections 39*a*, 39*b*1, 39*b*2 forming part of the third gas ducts 39.

Again, the primary gas duct sections 37*a*, 39*a* extend parallel to surface 7 and are located between surface 7 and nozzle carrier 6 to use the space available in support structure 8. Advantageously, they are arranged between surface 7 and the ejection electrodes 40.

The primary gas ducts 37*a* and 39*a* of the second and third gas ducts 37, 39 extend parallel to each other and to the rows or columns of the nozzle array. They are arranged alternatingly in a common plane, i.e. each primary gas duct 37*a* of the second gas ducts 37 is arranged immediately between two primary gas ducts 39*a* of the third gas ducts 39 and vice versa (with the exception of the primary gas ducts and the edges of the nozzle array).

Figure 18:
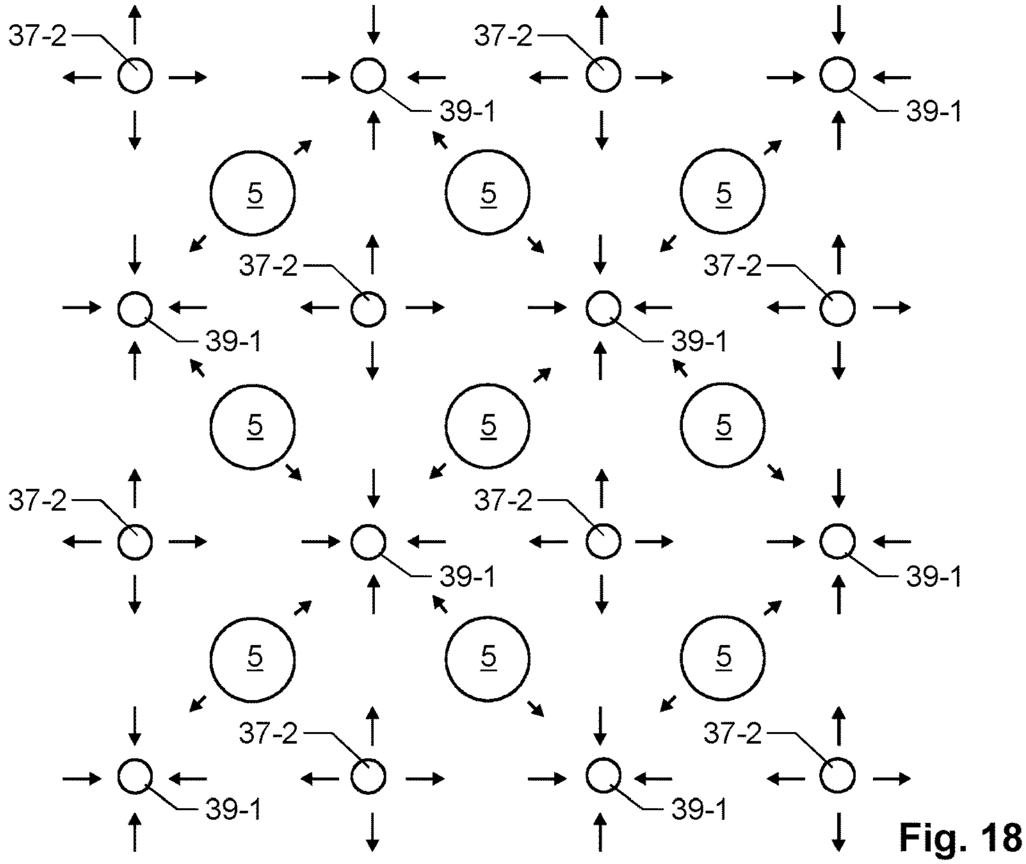
FIG. 18 is a view of the front surface of the print head.

In order to explain the arrangement of the secondary ducts 37*b*1, 37*b*2, 39*b*1, 39*b*2, reference is first made to FIG. 18, which shows a view of front surface 7 of print head 3 as seen from the target. As shown, in the present embodiment, each recess 5 and therefore each nozzle 4 is surrounded by two second ends 37-2 of the second gas ducts 37 and two first ends 39-1 of the third gas ducts 39, with the former blowing gas into the region between print head 3 and target 2 and the latter sucking gas away from this region.

In order to avoid a lateral flow of gas across one of the recesses 5, the two second ends 37-2 of the second gas ducts 37 and two first ends 39-1 of the third air ducts 39 are alternatingly arranged on the corners of a rectangle, in particular a square, centered on recess 5. The resulting air gas flow pattern is shown by arrows in FIG. 18. The longer arrows show the gas flows between the second ends 37-2 and the first ends 39-1, and the shorter arrows show the gas flows between the gas from the second ends 34-1 of the first gas ducts 34 and the first ends 39-1.

This kind of design—without the flow from the recesses 5—is described in more detail in in WO 2021/008817.

Turning back to FIG. 15, in order to obtain this kind of pattern of the second ends 37-2 and the first ends 39-1, neighboring secondary duct sections **37*b*1, 37*b*2 branch off on different sides of their primary duct section 37*a* of second gas duct 37. Similarly, neighboring secondary duct sections 39*b*1, 39*b*2 branch off on different sides of their primary duct section 39*a* of third gas duct 39. Along a line 102 located between two neighboring primary ducts 37*a*, 39*a* and extending parallel to the primary ducts 37*a*, 39*a*, the secondary duct sections (37*b*1, 37*b*2) of the second gas ducts (37) alternate with the secondary duct sections (39*b*1, 39*b*2) of the third gas ducts (39**).

This is shown in FIG. 15 for the first parts **37*b*1, 39*b*1 of the secondary duct sections, with these first parts being arranged on a common plane with the primary duct sections 37*a*, 39*a*. And it is shown in FIG. 16 for the second parts 37*b*2, 39*b*2 of the secondary duct sections, with these second parts extending along ejection direction X and connecting the first parts 37*b*1, 39*b*1 to the ends 37-2 and 39-1**, respectively.

Again, the secondary duct sections **37*b*1, 37*b*2 and 39*b*1, 39*b*2 are designed such that they have a much higher flow resistance than the primary duct sections 37*a*, 39*a*, which allows to make the flow through the secondary duct sections along the length of the primary duct sections 37*a*, 39*b*** more uniform.

FIG. 15 also shows chambers 104 located above the leads **103*a* (see FIG. 14). Each chamber 104 is located between two neighboring primary duct sections 37*a*, 39*a* and separated from the same by means of walls 106*a*, 106*b*. These chambers reduce the risk of electrical breakdown caused by the voltages carried by the leads 103*a***.

Figure 16:
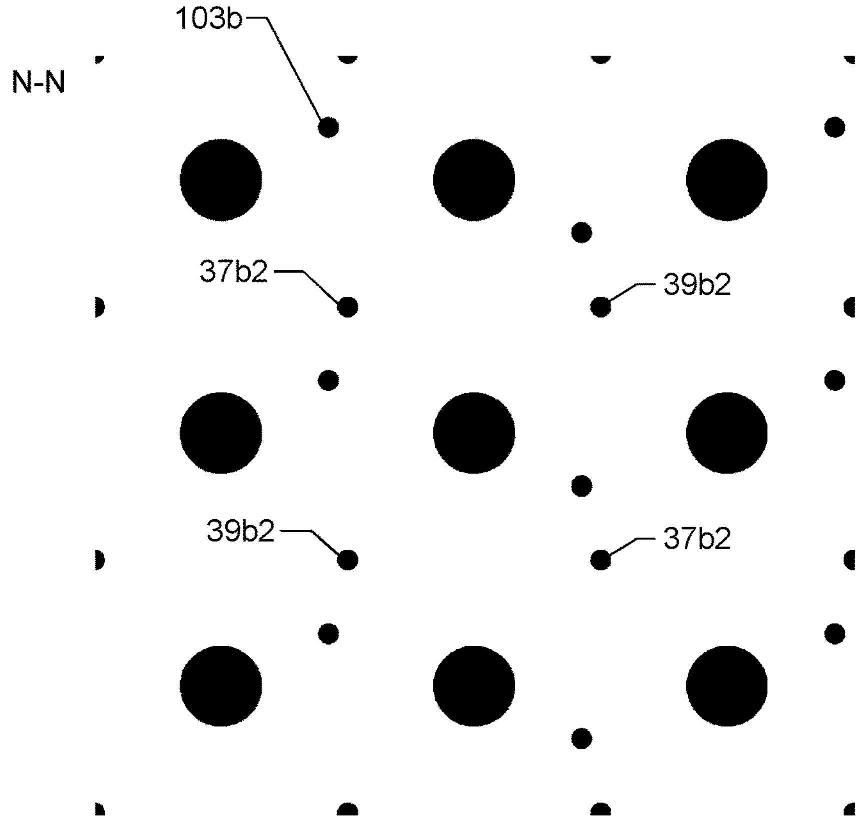
FIG. 16 is a horizontal sectional view along line N-N of FIG. 2.

Note that the vias **103*b* of FIG. 16 continue through the sublayer of FIG. 16 to connect to the shielding electrodes 14*c* of FIG. 17**.

Evaporator

As mentioned, at least one evaporator 35 is arranged along the first gas ducts 34 to saturate (or at least partially saturate) the gas with a suitable liquid as mentioned above.

This evaporator 35 may e.g. be a bubble system where the gas is led, in bubbles, through a pool of the liquid. This type of evaporator is typically arranged outside print head 3.

Figure 20:
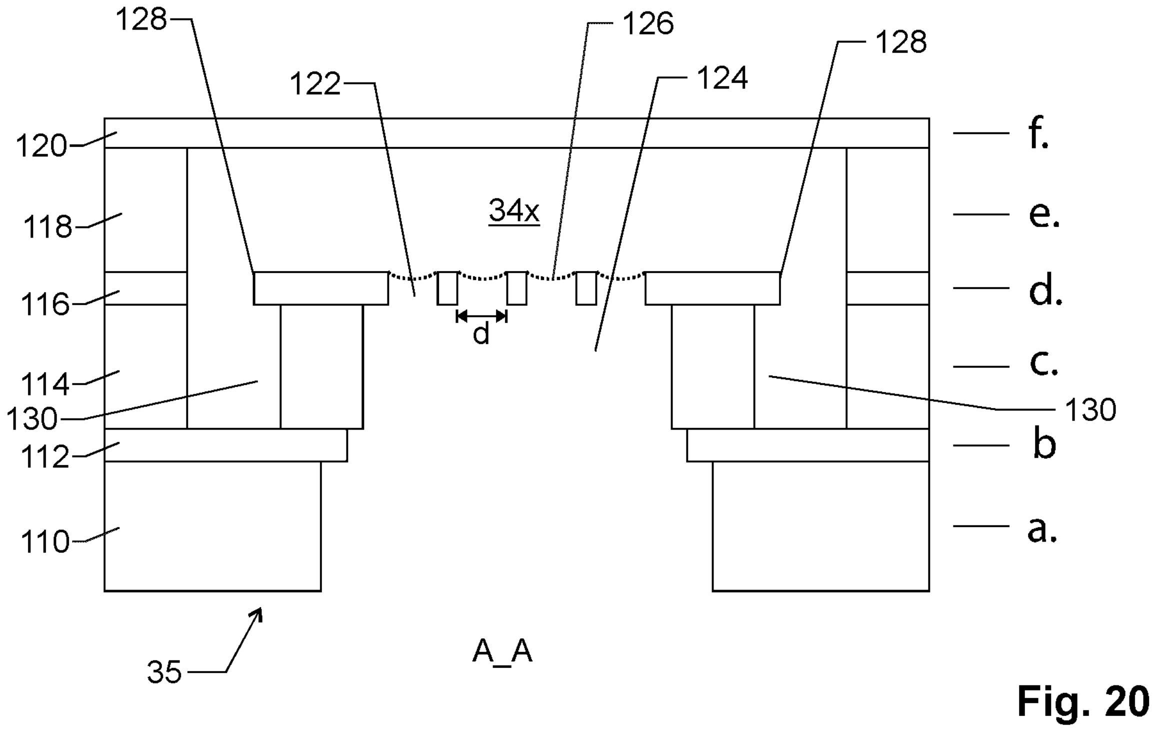
FIG. 20 is a sectional view of an embodiment of an evaporator along line A-A of FIG. 22.
Figure 21:
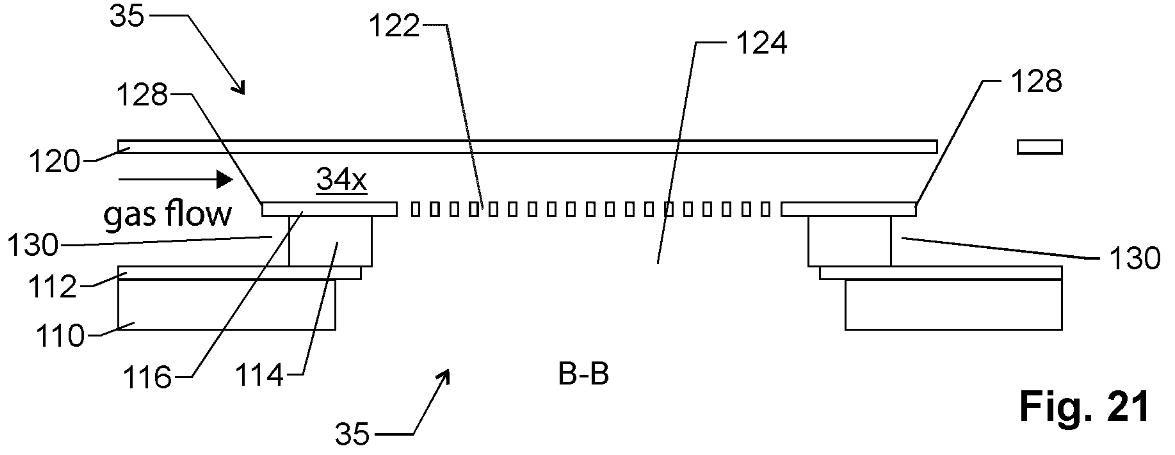
FIG. 21 is a sectional view of the evaporator of FIG. 20 in a plane perpendicular to the one of FIG. 20 along line B-B of FIG. 22, with FIG. 21 being at a smaller scale than FIG. 20, FIG. 22 are sectional views along lines a-f of FIG. 20.
Figure 22:
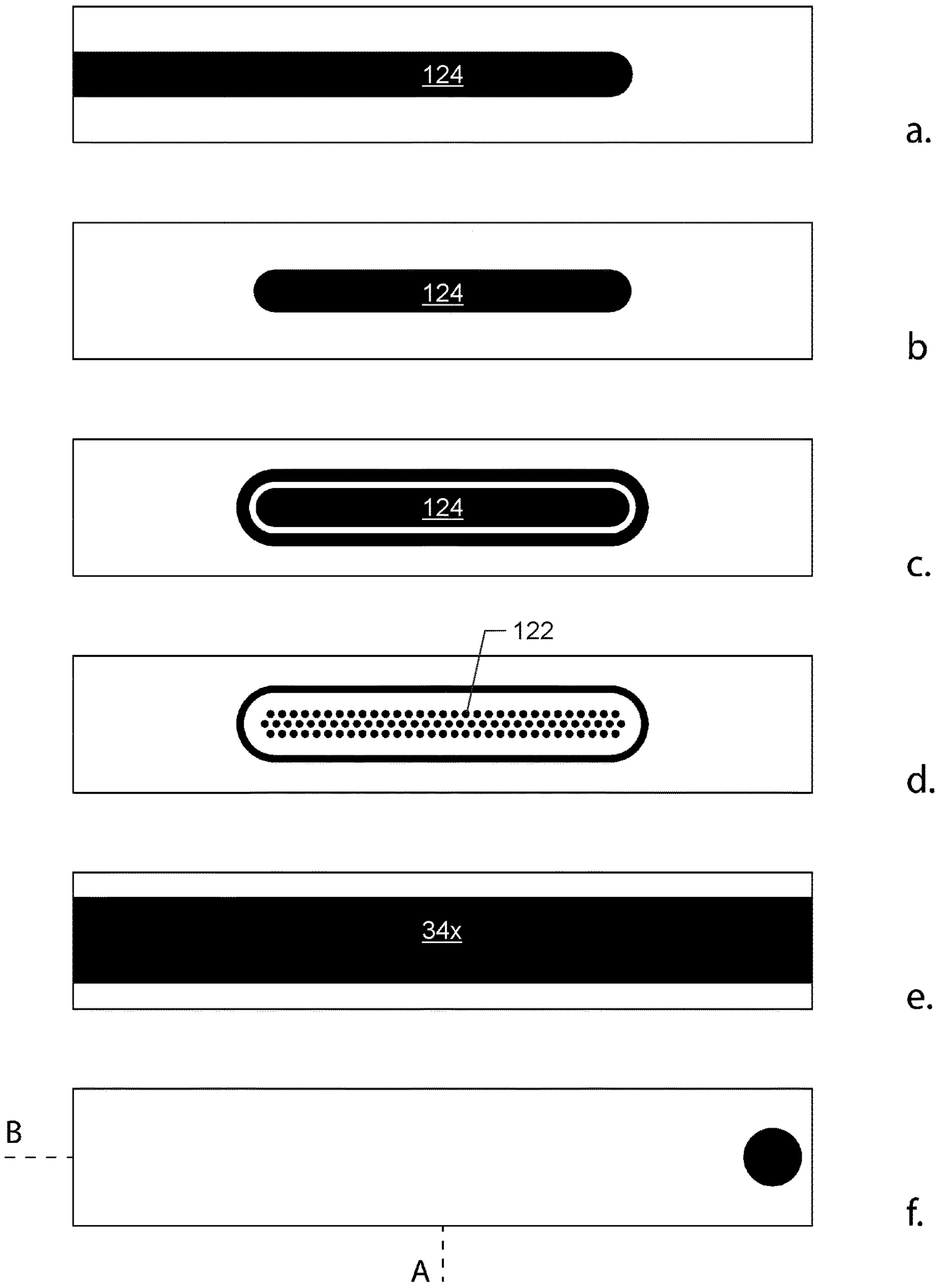

Alternatively or in addition thereto, evaporator 35 may also be located in print head 3. An embodiment of an evaporator that may be integrated into the layer structure of a print head is shown in FIGS. 20-22.

This evaporator formed by layers 110-120 of print head 3. These layers may e.g. be sublayers of support structure 8 and/or of nozzle carrier 6.

Advantageously, print head 3 comprises a plurality of such evaporators 35.

The gas from gas source 33 extends through a duct section **34*x*, which forms part of first gas duct 34. A layer 116 forming one of the side walls of duct section 34*x* comprises a plurality of openings 122, with each opening connecting duct section 34*x* and therefore the first duct to a chamber 124 on the other side of layer 116**.

Chamber 124 is filled with the liquid to be evaporated. Duct section **34*x* is under a slight overpressure as compared to the liquid filled into chamber 124. This is due to the fact that that the duct section 34*x* contains gas that is under pressure so it flows out of the second ends 34-2, which leads to a region of atmospheric pressure inside the recesses 5. Liquid fills the openings 122 by surface tension and from an interface 126 (shown in dotted lines in FIG. 20). In order for the interface 126 not to be pushed back into the openings 122 by the pressured gas in the duct section 34*x***, the opening diameters are chosen small enough such that pressure stored inside the liquid interface due to surface tension is large than the pressure of the liquid.

A suitable pressure difference between the liquid and duct section **34*x* can be calculated, for round openings, from the radial diameter d of the openings 122. For d=5 μm and a liquid with the surface tension of water, the Young Laplace equation yields a pressure difference of less than 144 mbar before the liquid exists from the openings 122**. For a liquid with the surface tension of alkane, the pressure difference would have to be less than 40 mbar.

Advantageously, at least the openings 122 should be well wettable. When using a polymer laminate for layer 116, this can e.g. be achieved by treating it with an oxygen plasma while or after structuring it.

As can also be seen from FIGS. 20-22, the openings 122 are advantageously surrounded, on the side of duct section **34*x*, by edges 128 with an undercut 130 beyond the edges 128. This structure is advantageously provided with a poorly wettable surface, such as with one of the materials mentioned for coating 64 above. It pins any ink that may pass through the openings 122**.

In more general terms, the printing system may have an evaporator 34 in print head 3 which comprises

- A duct section **34*x* of the first gas duct 34: This duct section 34*x* guides the gas from gas source 33 towards the nozzles 3**.
- A liquid chamber 124: This chamber contains the liquid to be evaporated.
- A wall 116 separating the duct section **34*x* and the liquid chamber 124: This wall prevents the liquid from freely flowing into the duct section 34*x***.
- A plurality of openings 122 in the wall 116: These openings connect the duct section **34*x* and the liquid chamber 124** and provide passage for the liquid to reach the duct section.

Advantageously, the smallest diameter of each of the openings is 10 μm or less for allowing to form a liquid interface as described above.

Manufacturing the Print Head

The present print head can be manufactured using techniques as they are e.g. knows from semiconductor manufacturing and packaging, e.g. as described in WO 2013/000558, WO 2016/120381, WO 2016/169956, and in WO 2021/008817.

Operating the Printing System

In operation, i.e. while printing, ink is fed to the nozzles 4 by means of the supply ducts 15. This ink is restricted to the region between the nozzles 4 and the ink retainers 66.

To eject ink drops, the voltage at thedesired ejection electrode(s) (in respect to the voltage of the ink) is increased temporarily. For example, a voltage pulse of 400 V may be generated. While not printing, the voltage at the ejection electrodes is maintained at a level where no ink is ejected. Advantageously, it is non-zero, though, e.g. at 200 V.

As mentioned above, the electric field at ink retainer 66 is advantageously kept low, e.g. at less than 50%, in particular at less than 10%, of the field strength at the forward end 70 of the nozzle. Since high electric field strengths reduce the surface tension of the ink, this procedure reduces the tendency of the ink to wet the ink retainer and to cross it.

The suction ducts 16, if present, are used to retrieve ink from the nozzles.

Gas is sent from first gas source 33 into the first gas ducts 34, moisturized by evaporator 35, and used to provide a "wet" atmosphere at the location of the nozzles 4.

While printing, dry gas is sent from second gas source 36 through the second gas ducts 37 to the region 9 between print head 3 and target 2. It expedites thedrying of the ink on target 2, but the flow of gas from the first gas ducts 34 prevents this dry gas from entering the recesses 5 and reaching the nozzles 4. The flow of gas from the first gas ducts 34 also prevents air from entering the recesses when the print head is moved quickly along the target.

The sum of the gas flows through the first and second gas ducts 34, 37 is advantageously equal to the flow of gas through the third gas ducts 39 for the reasons mentioned above.

Second Embodiment

Figure 23:
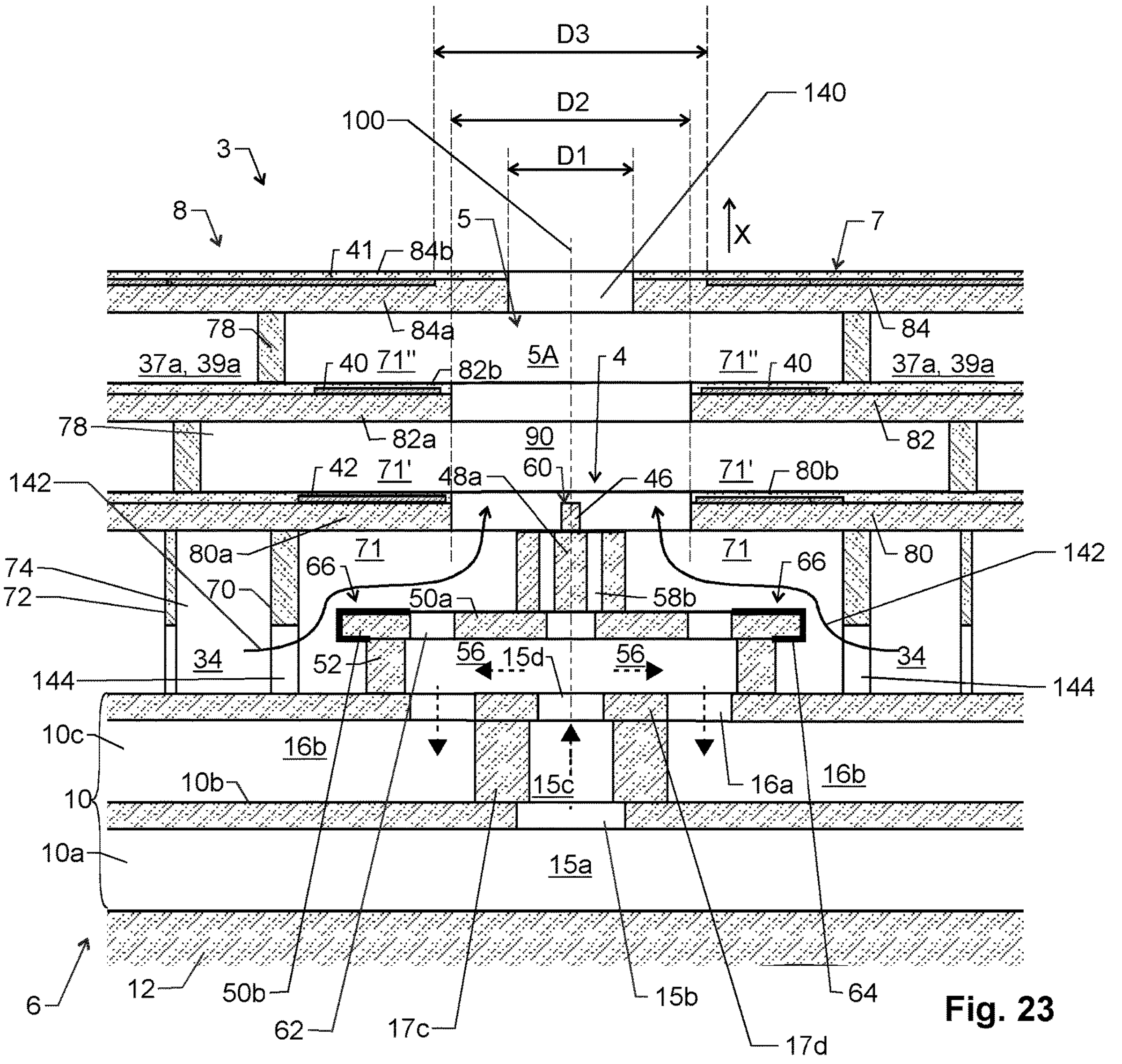
FIG. 23 shows a sectional view of a second embodiment.

FIG. 23 shows a sectional view of a second embodiment. It corresponds to the first embodiment of FIG. 2*ff* with two notable exceptions, which can be used either alone or in combination.

A first difference refers to the size of the exit aperture 140 of recess 5 (or another aperture within recess 5). While, in the embodiment of FIG. 2, this exit aperture 140 is wide, exit aperture 140 of the second embodiment has a diameter D1 that is the smallest diameter of the recess 5 forward from nozzle 4.

This design is advantageous in that it reduces the gas exchange at exit opening 140, which allows keeping the saturation in recess 5 high even with a low flow of humidified gas.

Advantageously, any electrode at extending around recess 5 has a diameter D3 larger than diameter D1. In the shown embodiment, for example, shielding electrode 41 forms an opening around recess 5 having a diameter D3 that is larger than diameter D1, advantageously at least 50% larger than D1. This is based on the understanding that, when placing an electrode close to nozzle axis 100, it has to be centered with high precision around nozzle axis 100 lest it might laterally deflect the ink. By using a large diameter D3, larger than thediameter D1 of aperture 140, a small aperture 140 can be used without the need for high-precision electrode placement.

For this reason, advantageously, aperture 140 is formed by a dielectric layer of support structure 8.

In the embodiment of FIG. 23, aperture 140 is formed by the foremost layer of support structure 8, e.g. by carrier layer 84 holding shielding electrode 41.

Alternatively, though, another layer of support structure 8 may form aperture 140. For example, a separate dielectric layer may be provided to form aperture 140. For example, aperture 140 may be formed by a separate (i.e. additional to the layers shown in FIG. 23) dielectric layer forming the font surface of print head 3.

In yet another example, aperture 140 may be formed by carrier layer 82 holding ejection electrode 40. In this case, again, ejection electrode 40 advantageously has a larger inner diameter D3 than thediameter D1 of aperture 140.

In order to form a high-saturation cavity within recess 5, aperture 140 should be located in front of a first section 5A of recess 5, with first section 5A including the entry of first gas duct 34 to recess 5 as well as the nozzle 4.

Hence, in other words, at least some of the recesses 5, advantageously all of them, have an aperture 140 arranged in front of a first section 5A of the recess, wherein at least one of the first ducts 34 enters the recess 5 in the first section 5A, the nozzle is arranged in the first section 5A, and the first section 5A has a diameter D2 larger than thediameter D1 of aperture 140, advantageously at least 50% larger.

In addition, advantageously, any electrode 40, 41, 42 extending around recess 5 has an inner diameter D3 larger, advantageously at least 50% larger, than thediameter D1 of aperture 140.

Another advantageous difference between the embodiment of FIG. 23 and the embodiment of FIG. 2 lies in where the first duct 34 enters recess 5. In the second embodiment, first duct 34 enters recess 5 at a location behind the front most part 60 of nozzle 4, with the gas flow schematically illustrated by arrows 142. Thus, the flow of saturated gas from first duct 34 prevents ink evaporation at the nozzle.

In the embodiment of FIG. 23, first duct 34 therefore extends e.g. through a rearmost level (corresponding to level E of FIG. 2) of support structure 8, even though it may optionally also extend through e.g. through level or G of the embodiment of FIG. 2).

Hence, in other words, for at least some of the recesses 5, advantageously for all of them, at least one of the first ducts 34 enters the recess 5 at a location behind a front most part 60 of the nozzle 4.

Guide means, such as formed by the solid parts of wall 70 in FIG. 23, may be provided for guiding the flow saturated gas and directing it at certain parts of nozzle 4.

As can also be seen in FIG. 23, several first ducts 34 advantageously enter recess 5 through several openings 144 arranged in rotational symmetry around nozzle axis 100, thereby creating a symmetric flow of gas.

The openings 144 may, in respect to nozzle axis 100, be arranged radially outside ink retainer 66, which reduces the risk of ink flowing over ink retainer 66.

Hence, advantageously, for at least some of the recesses 5, advantageously for all of them, an ink retainer 66 is arranged around a base of nozzle 4. The ink retainer is adapted to laterally constrain the ink. At least some of the first ducts 34 enter recess 5, in respect to nozzle axis 100, through several openings 144 arranged radially outside (i.e. laterally outside with "laterally" as defined above) the retainer.

Notes

FIGS. 3-6 above illustrate a specific embodiment how ink can be fed to the nozzles 4 and (optionally) be retrieved therefrom. It must be noted that this design of duct sections is only one possible embodiment of handling the ink, and other geometries of ducts may be used as well, such as e.g. described in WO 2021/008817.

Similarly, other designs can be used for connecting the gas ducts to the recesses 5 and front surface 7, e.g. as described in WO 2021/008817.

Even though the present invention is advantageously employed for electrohydrodynamic ink jet printing systems, where liquid ink must be present at the top of the nozzles and is therefore very prone to evaporation, it can also be used in other types of printing systems as mentioned above.

The dielectric sublayers of the print head typically have a thickness between 5 and 30 μm while the metallic sublayers are typically much thinner.

In most of the embodiments shown so far, each nozzle is surrounded by an ink retainer, which defines a restricted area where the ink can flow from the nozzle.

In the examples, each nozzle is surrounded by its own ink retainer. Alternatively, several nozzles may be surrounded by a common ink retainer, i.e. one ink retainer may surround several nozzles.

Alternatively or in addition thereto, each support element of support structure 8 may be surrounded by an ink retainer, which defines an ink-free area around the support element, preventing the ink to reach the support element. This may be particularly advantageous if the support elements are forming individual, isolated pillars.

In the embodiments described so far, three electrodes at three different vertical levels have been mentioned: the ejection electrodes, the guard electrodes, and the shielding electrodes. It must be noted, though, that there may also be other electrodes, such as:

- Electrodes may be provided in nozzle carrier 6, e.g. at the supply ducts 15 and/or suction ducts 16, and/or at the nozzle and/or at the ink retainers for defining the potential of the ink. Such electrodes allow e.g. to keep the ink at a similar or the same potential as the guard electrodes 42. Advantageously, such electrodes are of platinum and/or gold.
- Further electrodes (e.g. between ejection electrode 38 and shielding electrode 40 of FIG. 2) may be provided if differently sized nozzles are present on the print head. This is particularly useful for nozzles where thedistance between the ejection electrode and the nozzle is considerable smaller than thedistance between the shielding electrode and the ejection electrode.
- In the embodiments described so far, primary gas duct sections 34*a*, 37*a*, 39*a* were formed within the support structure 8. This simplifies manufacturing because primary gas duct sections 34*a*, 37*a*, 39*a* can be formed in the same layer as the secondary gas duct sections 34*b*1, 34*b*2, 37*b*1, 39*b*1 that extend parallel to the nozzle carrier 6, and they can be formed within layers that are needed to create the distance between electrodes anyways. At the same time, controlling pressure drop can be more difficult because the thickness of the layer is fixed and a higher pressure drop of secondary gas duct sections 34*b*1, 34*b*2, 37*b*1, 39*b*1 can only be obtained by reducing duct width. Since the latter is limited by manufacturing constraints, primary duct sections 34*a*, 37*a*, 39*a* may be formed within a thicker layer than the layer that forms secondary gas duct sections 34*b*1, 34*b*2, 37*b*1, 39*b*1. Also, since the thickness of the layers contained in support structure 8 is affected also by electric considerations, e.g. by desired distances between thedifferent electrodes, thickness of these layers cannot be freely adjusted to achieve a desired flow resistance. To solve this issue, additional layers may therefore be formed within front layer 10 and then the secondary gas duct sections may be at least partly be formed by vertical channels which, due to their length, may in fact create the required pressure drop as well. Particularly, they may be formed within hollow-type electrical vias 14.

As can be seen from the FIGS. 2, 12, and 15, the gas ducts 34, 37, 39 comprise a first set of sections 34*a* arranged at a first level (denoted by J in FIG. 2) of support structure 8 and a second set of sections 37*a*, 39*a* extending along a second level (denoted by M in FIG. 2) of support structure 8, with the second level M being arranged in front of the first level M being arranged in front of the first level J. This multi-level design allows packing a larger number of individual duct sections into support structure 8. The sections 34*a*, 37*a*, 39*a* advantageously extend parallel to front surface 7.

Where the gas ducts 34, 37, 39 run along support structure 8, they are advantageously embedded within the support structure and extend parallel thereto.

While there are shown and described presently preferred embodiments of the invention, it is to be distinctly understood that the invention is not limited thereto but may be otherwise variously embodied and practiced within the scope of the following claims.

The invention claimed is:

1. An electrohydrodynamic inkjet printing system comprising:

a print head, a plurality of ink nozzles arranged on the print head, a plurality of ejection electrodes located at the ink nozzles, a support structure arranged in front of the ink nozzles and forming a front surface, wherein the ejection electrodes are arranged on the support structure, a plurality of recesses arranged in the front surface with at least one of the ink nozzles arranged in each of the plurality of recesses, and a plurality of gas ducts extending, over at least part of their length, along the support structure, wherein ends of the gas ducts are arranged in the recesses.

2. The printing system of claim 1, wherein the ejection electrodes are arranged around the recesses between the front surface and the ink nozzles.

3. The printing system of claim 1, wherein the print head further comprises a nozzle carrier forming a base of the recesses and extending parallel to the front surface, wherein the nozzles are mounted to the nozzle carrier, wherein the gas ducts comprise duct sections extending parallel to the nozzle carrier in a region between the nozzle carrier and the front surface.

4. The printing system of claim 1, wherein the gas ducts comprise primary and secondary duct sections, wherein:

the primary duct sections extend through the print head in a direction parallel to the front surface and parallel to each other, and from each primary duct section, a plurality of the secondary duct sections branches off to connect each primary duct section to a plurality of the recesses.

5. The printing system of claim 4, wherein the primary duct sections are located between the front surface and a nozzle carrier carrying the nozzles.

6. The printing system of claim 4, wherein cross sections of the secondary gas duct sections are at least 5 times, in particular at least 10 times, smaller than cross sections of the primary gas duct sections.

7. The printing system of claim 4, wherein the secondary duct sections have a total length L from the primary duct sections to the recesses that is a fraction k of a distance D between two neighboring nozzles with L=k·D and with k at least 0.1, in particular at least 0.25.

8. The printing system of claim 5, wherein the primary duct sections are located between the front surface and the ejection electrodes.

9. The printing system of claim 1, further comprising:

a first gas source, first gas ducts as at least part of the gas ducts arranged at least partially in the print head, wherein at least a first end of the first gas ducts is connected to the first gas source and a plurality of second ends of the first gas ducts is arranged at the ink nozzles, and at least one evaporator arranged along the first gas ducts before the nozzles.

10. The printing system of claim 9, wherein the evaporator is adapted to evaporate at least one fluid into the gas before it arrives at the nozzles.

11. The printing system of claim 9, wherein the evaporator comprises a liquid chamber.

12. The printing system of claim 11, wherein the evaporator further comprises:
a duct section of the first gas duct, and
a plurality of openings wherein the openings connect the duct section and the liquid chamber.

13. The printing system of claim 12, wherein the evaporator comprises a wall separating the duct section and the liquid chamber, wherein the plurality of openings as arranged in the wall.

14. The printing system of claim 12, wherein the openings are surrounded, on a side of the duct section, by edges with an undercut beyond the edges.

15. The printing head of claim 9, wherein at least one of the second ends of the first gas ducts is arranged in each of the plurality of recesses.

16. The printing system of claim 15, wherein, at least two of the second ends of the first gas ducts are located in each recess, and they are arranged in rotational symmetry around a nozzle axis.

17. The printing system of claim 9, further comprising:
a second gas source, and
second gas ducts as at least part of the gas ducts, arranged at least partially in the print head, wherein at least a first end of the second gas ducts is connected to the second gas source and a plurality of second ends of the second gas ducts is arranged at the ink nozzles, with the second ends of the first gas ducts being closer to the ink nozzles than the second ends of the second gas ducts,
wherein the second gas ducts do not communicate with the evaporator(s).

18. The printing system of claim 17, wherein the second ends of the second gas ducts are located in the front surface.

19. The printing system of claim 9, wherein, for at least some of said recesses, the recess comprises an aperture arranged in front of a first section of the recess wherein
at least one of the first ducts enters the recess in the first section,
the nozzle is arranged in the first section, and
the first section has a diameter larger than a diameter of the aperture, in particular at least 50% larger.

20. The printing system of claim 19, wherein any electrode extending around the recess has an inner diameter larger than the diameter of the aperture, in particular at least 50% larger.

21. The printing system of claim 9, wherein for at least some of said recesses, at least one of the first ducts enters the recess at a location behind a front most part of the nozzle.

22. The printing system of claim 9, wherein for at least some of said recesses, the print head comprises an ink retainer arranged around a base of the nozzle, wherein at least some of the first ducts enter the recess, in respect to an axis of the nozzle, through several openings arranged radially outside the retainer.

23. The printing system of claim 1, wherein the evaporator is located, at least in part, in the print head.

24. The printing system of claim 1, further comprising:
a gas sink, and
third gas ducts arranged at least partially in the print head, wherein first ends of the third gas ducts are located at the nozzles and at least a second end of the third gas ducts is connected to the gas sink.

25. The printing system of claim 24, wherein the first ends of the third gas ducts are located in the front surface of the print head.

26. The printing system of claim 24,
wherein the gas ducts comprise primary and secondary duct sections, wherein:
the primary duct sections extend through the print head in a direction parallel to the front surface and parallel to each other and
from each primary duct section, a plurality of the secondary duct sections branches off to connect each primary duct section to a plurality of the recesses,
wherein the printing system further comprises
a first gas source,
first gas ducts as at least part of the gas ducts arranged at least partially in the print head, wherein at least a first end of the first as ducts is connected to the first as source and a plurality of second ends of the first gas ducts is arranged at the ink nozzles,
at least one evaporator arranged along the first gas ducts before the nozzles,
a second gas source, and
second gas ducts as at least part of the gas ducts, arranged at least partially in the print head, wherein at least a first end of the second gas ducts is connected to the second gas source and a plurality of second ends of the second gas ducts is arranged at the ink nozzles, with the second ends of the first gas ducts being closer tot the ink nozzles than the second ends of the second gas ducts w herein the second gas ducts do not communicate with the evaporator(s),
wherein the primary gas ducts of the second and third gas ducts extend parallel and are arranged alternatingly in a common plane.

27. The printing system of claim 26, wherein the primary gas duct sections of the third gas ducts are located between the front surface and a nozzle carrier carrying the nozzles,
and in particular wherein the primary duct sections of the third gas ducts are located between the surface and the ejection electrodes.

28. The printing system of claim 26, wherein secondary duct sections branch off from the primary duct sections of the second and third gas ducts, wherein neighboring secondary duct sections of the second gas duct branch off on different sides of their primary duct section of the second gas duct, and neighboring secondary duct sections of the third gas duct branch off on different sides of their primary duct section of the third gas duct, and
wherein, along a line located between two neighboring primary duct sections of the second and third gas ducts and extending parallel to the primary duct sections of the second and third gas ducts, the secondary duct sections of the second gas ducts alternate with the secondary duct sections of the third gas ducts.

29. The printing system of claim 1, further comprising, in said print head
duct sections extending parallel to a front surface of the print head, and
at least one reservoir, wherein a plurality of the duct sections branch off from the reservoir,
wherein a cross section of the duct sections decreases with increasing distance from the reservoir(s).

30. The printing system of claim 29, having a first and a second reservoir arranged in the print head, with a first set of duct sections branching off from the first reservoir and a second set of duct sections branching off from the second reservoir, wherein the first and second reservoirs are arranged at opposite lateral sides of an array of the ink nozzles, and wherein the first and second sets of duct sections are arranged interdigitally.

31. The printing system of claim 1, further comprising a plurality of electrically conductive vias in the print head, with each of these vias being laterally surrounded by a non-conductive first wall, which is laterally enclosed by a cavity, and in particular wherein the cavity is laterally enclosed by a non-conductive second wall.

32. The printing system of claim 1, further comprising a plurality of parallel sections of the gas ducts separated by walls and extending along the support structure.

33. The printing system of claim 1, further comprising a first set of sections of the gas ducts extending along a first level of the support structure and a second set of sections of the gas ducts extending along a second level of the support structure, with the second level being arranged in front of the first level.

34. A method for operating the printing system of claim 1, comprising:

feeding ink to the ink nozzles, and feeding a gas from the gas source through the gas ducts and/or feeding gas through the gas ducts to a gas sink, and evaporating, by an evaporator, at least one liquid into the gas fed through the gas ducts.

35. The method of claim 34, wherein the ink comprises a solvent and wherein the liquid comprises at least one component of the solvent.

36. The method of claim 34, further comprising feeding a gas through at least some of the gas ducts that has a breakdown voltage, relative to air, of at least 2.

37. The method of claim 34, further comprising:

feeding a first flow of gas through a first subset of the gas ducts to a region between the print head and the target and retrieving a second flow of gas through a second subset of the gas ducts, with the first and the second gas flows being equal.

38. The method of claim 34, further comprising:

feeding a first gas from the first gas source through first ones of the gas ducts to the nozzles, and feeding a second gas from a second gas source through second ones of the gas ducts to a region between the print head and the target, wherein a plurality of second ends of the second gas ducts is arranged at the ink nozzles, with the second ends of the first gas ducts being closer to the ink nozzles than the second ends of the second gas ducts, wherein the first gas delivered from the first gas source and the second gas delivered from the second gas source are different.

39. The method of claim 38, wherein the first gas is an inert gas for the ink while the second gas chemically reacts with the ink.

* * * * *